US008221207B2

(12) United States Patent
Sakuma

(10) Patent No.: US 8,221,207 B2
(45) Date of Patent: Jul. 17, 2012

(54) GAMING MACHINE WITH SELECTION STATE REPETITION BETWEEN STAGES

(75) Inventor: Hiro Sakuma, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1262 days.

(21) Appl. No.: 11/933,711

(22) Filed: Nov. 1, 2007

(65) Prior Publication Data

US 2008/0108417 A1 May 8, 2008

(30) Foreign Application Priority Data

Nov. 8, 2006 (JP) ................................ 2006-303384

(51) Int. Cl.
*A63F 13/00* (2006.01)

(52) U.S. Cl. .................................. 463/16; 19/20; 19/37

(58) Field of Classification Search .................... 463/16, 463/19, 37, 20
See application file for complete search history.

(56) References Cited

U.S. PATENT DOCUMENTS 5,855,514 A * 1/1999 Kamille .......................... 463/17
6,045,129 A * 4/2000 Cooper et al. ................ 273/292
6,237,913 B1 * 5/2001 Kamille ........................ 273/139
6,439,995 B1 * 8/2002 Hughs-Baird et al. .......... 463/20
6,602,137 B2 8/2003 Kaminkow et al.
6,722,983 B2 * 4/2004 Kaminkow et al. ............. 463/26
6,733,386 B2 * 5/2004 Cuddy et al. .................... 463/17
6,749,504 B2 * 6/2004 Hughs-Baird .................. 463/25
6,776,711 B1 8/2004 Baerlocher
6,817,944 B2 11/2004 Kaminkow et al.
6,875,108 B1 * 4/2005 Hughs-Baird .................. 463/26
7,273,415 B2 * 9/2007 Cregan et al. .................. 463/25
7,278,919 B2 * 10/2007 Souza et al. .................... 463/25
7,544,129 B2 * 6/2009 Baerlocher ........................ 463/9
7,585,218 B2 * 9/2009 Mead et al. ..................... 463/20
2005/0064929 A1 3/2005 Kaminkow et al.
2008/0108418 A1 * 5/2008 Sakuma .......................... 463/20
2009/0111561 A1 * 4/2009 Dewaal et al. .................. 463/20

* cited by examiner

*Primary Examiner* — Dmitry Suhol
*Assistant Examiner* — David Duffy
(74) *Attorney, Agent, or Firm* — Banner & Witcoff, Ltd.

(57) ABSTRACT

A gaming environment, in which a payout corresponding to a selection item selected by a player is provided, is described. Especially a gaming environment, in which in the second stage screen, when a symbol of "STRAWBERRY" is displayed on the position of the treasure boxes 101 which is in an open state, the game is proceeded to the final stage form the second stage based on that the player touches the next stage button 103B though the touch panel 11, the open and close states of each treasure box 101 on the final stage screen becomes the same as those on the second stage screen, is described.

8 Claims, 16 Drawing Sheets

FIG. 3

| | LEFT REEL | CENTER REEL | RIGHT REEL |
|---|---|---|---|
| CODE NO. | SYMBOL | SYMBOL | SYMBOL |
| 21 | RED 7 | RED 7 | RED 7 |
| 20 | PLUM | BELL | CHERRY |
| 19 | ORANGE | APPLE | ORANGE |
| 18 | PLUM | BELL | APPLE |
| 17 | ORANGE | CHERRY | ORANGE |
| 16 | PLUM | ORANGE | PLUM |
| 15 | ORANGE | PLUM | ORANGE |
| 14 | PLUM | CHERRY | PLUM |
| 13 | BLUE 7 | BELL | ORANGE |
| 12 | CHERRY | APPLE | PLUM |
| 11 | ORANGE | BELL | ORANGE |
| 10 | BELL | STRAWBERRY | PLUM |
| 09 | ORANGE | PLUM | BELL |
| 08 | STRAWBERRY | BLUE 7 | STRAWBERRY |
| 07 | BLUE 7 | BELL | BLUE 7 |
| 06 | ORANGE | APPLE | BELL |
| 05 | APPLE | BELL | CHERRY |
| 04 | PLUM | STRAWBERRY | PLUM |
| 03 | ORANGE | PLUM | ORANGE |
| 02 | PLUM | CHERRY | PLUM |
| 01 | BLUE 7 | BELL | ORANGE |
| 00 | CHERRY | APPLE | PLUM |

FIG. 5

| WINNING COMBINATION | | | PAYOUT AMOUNT |
|---|---|---|---|
| RED 7 | RED 7 | RED 7 | 10+BONUS GAME |
| BLUE 7 | BLUE 7 | BLUE 7 | 10 |
| BELL | BELL | BELL | 8 |
| APPLE | APPLE | APPLE | 7 |
| CHERRY | CHERRY | CHERRY | 5 |
| STRAWBERRY | STRAWBERRY | STRAWBERRY | 5 |
| PLUM | PLUM | PLUM | 4 |
| ORANGE | ORANGE | ORANGE | 3 |
| CHERRY | CHERRY | (ANY) | 2 |
| ORANGE | ORANGE | (ANY) | 2 |
| CHERRY | (ANY) | (ANY) | 1 |
| ORANGE | (ANY) | (ANY) | 1 |

FIG. 11

| FIRST STAGE | | |
|---|---|---|
| TREASURE BOX | CONTENT | STATE |
| NO.1 | 20 | x |
| NO.2 | 200 | x |
| NO.3 | 40 | x |
| NO.4 | 5 | x |
| NO.5 | 80 | x |
| NO.6 | 70 | x |
| NO.7 | 20 | x |
| NO.8 | 80 | x |
| NO.9 | 100 | x |
| NO.10 | 30 | x |
| NO.11 | 60 | x |
| NO.12 | 10 | x |
| NO.13 | 200 | x |
| NO.14 | 40 | x |
| NO.15 | 50 | x |
| NO.16 | 10 | x |
| NO.17 | 5 | x |
| NO.18 | 20 | x |
| NO.19 | 50 | x |
| NO.20 | 30 | x |
| NO.21 | 10 | x |
| NO.22 | 70 | x |
| NO.23 | 60 | x |

FIG. 12

| SECOND STAGE | | |
|---|---|---|
| TREASURE BOX | CONTENT | STATE |
| NO.1 | 80 | × |
| NO.2 | STRAWBERRY | × |
| NO.3 | 70 | × |
| NO.4 | 20 | × |
| NO.5 | 100 | × |
| NO.6 | 5 | × |
| NO.7 | 40 | × |
| NO.8 | 20 | × |
| NO.9 | 80 | × |
| NO.10 | 30 | × |
| NO.11 | 60 | × |
| NO.12 | 10 | × |
| NO.13 | 40 | × |
| NO.14 | BELL | × |
| NO.15 | 10 | × |
| NO.16 | 20 | × |
| NO.17 | 50 | × |
| NO.18 | 5 | × |
| NO.19 | 10 | × |
| NO.20 | 50 | × |
| NO.21 | 70 | × |
| NO.22 | 30 | × |
| NO.23 | 60 | × |

FIG. 13

| FINAL STAGE | | |
|---|---|---|
| TREASURE BOX | CONTENT | STATE |
| NO.1 | 40 | × |
| NO.2 | 20 | × |
| NO.3 | 200 | × |
| NO.4 | 70 | × |
| NO.5 | 5 | × |
| NO.6 | 20 | × |
| NO.7 | 100 | × |
| NO.8 | 20 | × |
| NO.9 | 80 | × |
| NO.10 | 60 | × |
| NO.11 | 10 | × |
| NO.12 | 40 | × |
| NO.13 | 30 | × |
| NO.14 | 60 | × |
| NO.15 | 70 | × |
| NO.16 | 5 | × |
| NO.17 | 200 | × |
| NO.18 | 80 | × |
| NO.19 | 30 | × |
| NO.20 | 10 | × |
| NO.21 | 50 | × |
| NO.22 | 10 | × |
| NO.23 | 50 | × |

FIG. 14

| FIRST STAGE | | |
|---|---|---|
| TREASURE BOX | CONTENT | STATE |
| NO.1 | 20 | × |
| NO.2 | 200 | × |
| NO.3 | 40 | × |
| NO.4 | 5 | × |
| NO.5 | 80 | × |
| NO.6 | 70 | × |
| NO.7 | 20 | × |
| NO.8 | 80 | × |
| NO.9 | 100 | × |
| NO.10 | 30 | × |
| NO.11 | 60 | × |
| NO.12 | 10 | × |
| NO.13 | 200 | × |
| NO.14 | 40 | × |
| NO.15 | 50 | ○ |
| NO.16 | 10 | × |
| NO.17 | 5 | × |
| NO.18 | 20 | ○ |
| NO.19 | 50 | × |
| NO.20 | 30 | ○ |
| NO.21 | 10 | × |
| NO.22 | 70 | × |
| NO.23 | 60 | × |

GAMING MACHINE WITH SELECTION STATE REPETITION BETWEEN STAGES

CROSS-REFERENCE TO RELATED APPLICATIONS

This application is based upon and claims a priority from the prior Japanese Patent Application No. 2006-303384 filed on Nov. 8, 2006, the entire contents of which are incorporated herein by reference.

BACKGROUND

1. Field

The present invention relates to a gaming machine and a gaming method, in which a payout corresponding to a selection item selected by a player is provided.

2. Description of Related Art

Conventionally, it is known a selection-type bonus game as one of the bonus games executed in the slot machine. In the selection-type bonus game, the number of the times for a player to select plural selection items displayed on the screen is limited. To the selection items which the player may select within the limited number of the times, awards such as payout or increasing of the number of the times may be provided to the player. And a payout corresponded to each selection item selected by a player himself/herself may be summed up and provided to the player.

Also, there are cases that the number to double the total payout amount or the benefit for obtaining a trigger to proceed to the next stage, may be associated with the selection items. Here, when a game proceeds to the next stage based on the benefit corresponding to the selection item selected by the player, there is no connection between the present stage and the next stage. When the game proceeds to the next stage, the plural selection items are renewed, and the chance to re-select all the selection items may be provided to the player.

SUMMARY

In view of the foregoing, one or more aspects of the present invention relate to a gaming machine, a gaming method thereof, a game system, a computer readable medium having computer-executable instructions or the like that on a stage screen, when a predetermined symbol is displayed on a selection item, a predetermined button may be displayed. And when the predetermined button is touched by the player through a touch panel, the game may proceed from the current stage to another stage, wherein the state of selection items in the current stage is continued in both these two stages.

One or more of the above aspects of the invention is more fully described in the following detailed description when read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

FIG. 3 is an explanatory view showing the symbol rows displayed on the reels of the slot machine according to the embodiment.

FIG. 5 is a payout table showing the winning combinations and the payouts, corresponded with each other, the payout table being utilized in a base game conducted by using the reels.

FIG. 11 is an explanatory view showing an example of a selection item table used in the first stage in the bonus game according to the embodiment.

FIG. 12 is an explanatory view showing an example of a selection item table used in the second stage in the bonus game according to the embodiment.

FIG. 13 is an explanatory view showing an example of a selection item table used in the final stage in the bonus game according to the embodiment.

FIG. 14 is an explanatory view showing another example of a selection item table used in the first stage in the bonus game according to the embodiment.

DETAILED DESCRIPTION

The various aspects summarized precedingly may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A gaming machine according to one or more aspects of the invention is described in detail with reference to the drawings based on an embodiment embodying one or more aspects of the invention as a slot machine, a server, a game system. However, it is appreciated that one or more aspects of the present invention may be embodied in distributable (via CD and the like) or downloadable software games, console games, and the like. Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms "CPU" and "processor" are inclusive by nature, including at least one of hardware, software, or firmware. These terms may include a side of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server.

It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

Figure 1:
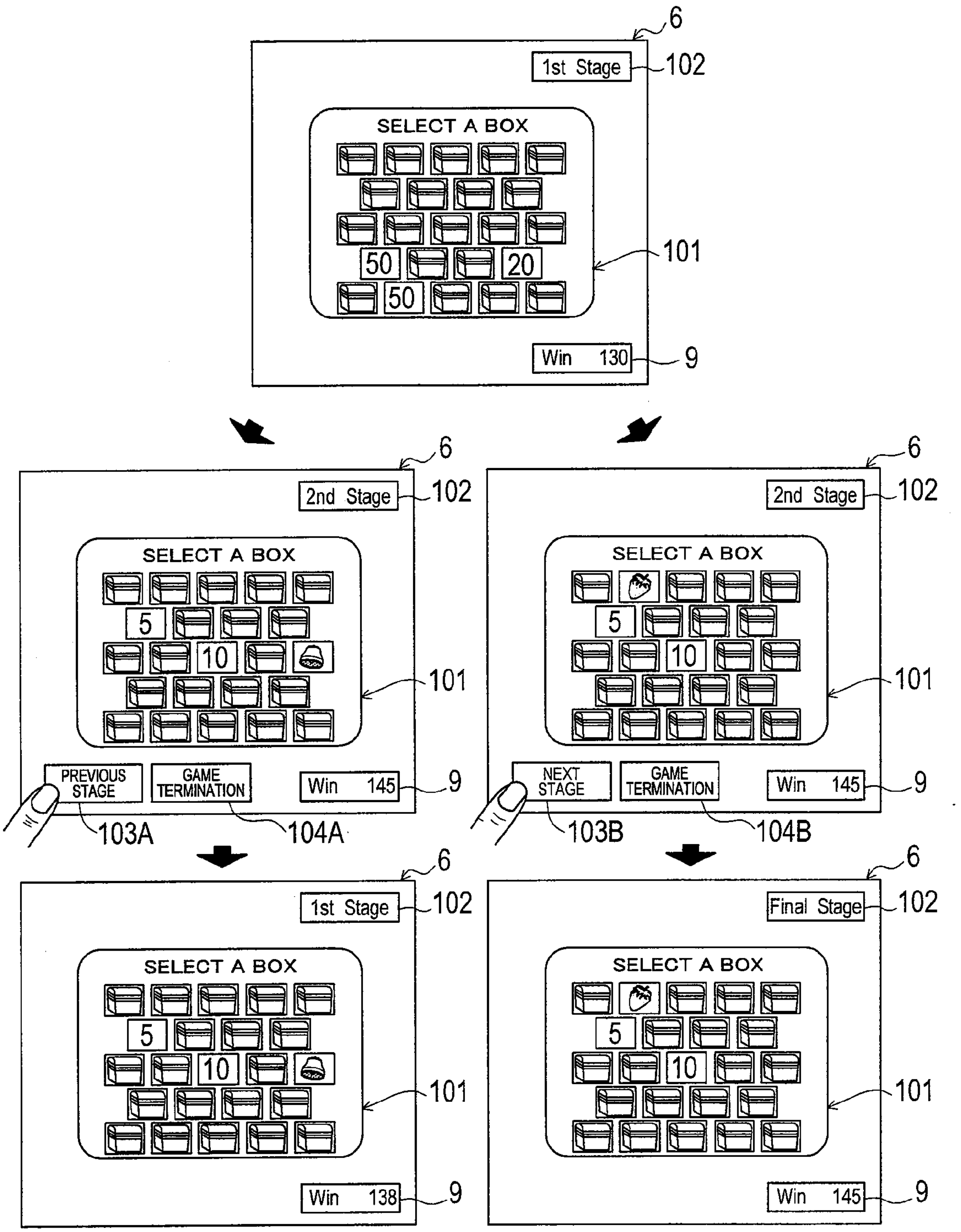
FIG. 1 is an explanatory view showing a bonus game executed in a slot machine according to the embodiment.

In a base game (slot game) executed by the slot machine according to the embodiment, when the symbol combination constructed from plural symbols on the pay line realizes a bonus game trigger, a bonus game is generated. Hereinafter, an example of a bonus game may be described. FIG. 1 is a view showing the feature of the bonus game executed by the slot machine according to the embodiment.

When a bonus game is generated, it proceeds to the first stage. On a lower image display panel 6, the screen of the first stage is displayed, and in such a screen twenty-three treasure boxes 101 are arranged in a close state. In the first stage, when a touch panel 11 arranged in front of the lower image display panel 6 is touched by a player, one of the twenty-three treasure boxes 101, corresponding to the touch panel 11 touched by the player, is selected by the player.

At this time, on the lower image display panel 6, the state of the treasure box 101 selected by the player is changed from a "close" state to an "open" state. On the lower image display panel 6, as shown on the upper position of FIG. 1, the payout amount, corresponding to the treasure box 101 which is in an open state, is overlapped and displayed on the treasure box 101. The displayed payout amount is provided to the player. On the screen of the first stage shown on the upper position of FIG. 1, the payout amount displayed on each of the three open treasure boxes 101 is "50", "20" and "50" respectively, therefore, a payout amount with a total of "120" is provided to the player.

When the number of the treasure boxes 101 which is in an open state becomes three, the game is changed from the first stage to the second stage. At this time, on the lower image display panel 6, a screen of the second stage is displayed, and in such a screen twenty-three treasure boxes 101 are arranged in a close state, as same as in the first stage. Also, in the second stage, three treasure boxes 101 may be selected by a player through the touch panel 11. On the lower image display panel 6, the state of the treasure box 101 selected by the player is changed from a "close" state to an "open" state.

Also, on the lower image display panel 6, as shown on the middle left position and the middle right position of FIG. 1, the payout amount, corresponding to the treasure box 101 which is in an open state, is overlapped and displayed on the treasure box 101. The displayed payout amount is provided to the player. In other words, in the second stage, the selection-type game is executed as same as in the first stage.

In the second stage, when a symbol of "BELL" is overlapped and displayed on the opened treasure box 101 on the lower image display panel 6, as shown in the middle left position of FIG. 1, a "previous stage button" 103A and a "game termination button" 104A are displayed.

When the game termination button 104A is touched by a player through the touch panel 11, the bonus game is terminated.

When the previous stage button 103A is touched by a player through the touch panel 11, on the lower image display panel 6, the screen of the first stage in which twenty-three treasure boxes 101 are arranged is displayed again. Thereby, the game is returned to the first stage from the second stage. However, when the screen of the first stage is displayed again on the lower image display panel 6, corresponding to the touch of the previous stage button 103A by the player, the state (open/close) of the treasure boxes 101 is preserved while continuing the close and open states of the treasure boxes 101 arranged at the same positions in both the second stage screen and the first stage screen, as shown on the middle left position and the lower left position of FIG. 1.

In the second stage screen displayed on the middle left position of FIG. 1, on the position of the three treasure boxes 101 which are opened, symbols of "5", "10" and "BELL" are displayed. When the previous stage button 103A is touched by the player, the game is returned to the first stage from the second stage. The state (open/close) of the treasure boxes 101 on the first stage screen as shown on the lower left position of FIG. 1, is as same as that of the second stage screen as shown on the middle left position of FIG. 1.

When the game returns from the second stage to the first stage, the payout amount which is obtained by the player in the second stage may be cut to a half (round off to the nearest whole number).

In the example, on the second stage screen as shown on the middle left position of FIG. 1, the symbols corresponding to the three treasure boxes 101 which are opened, are "5", "10" and "BELL". In other words, a total of "15" is the total amount which the player obtains in the second stage. Therefore, when the player selects to return to the first stage, the payout amount may be cut to a half, becoming to "8".

Meanwhile, in the second stage, as shown on the middle right position of FIG. 1, when a symbol of "STRAWBERRY" is overlapped and displayed on the opened treasure box 101, a "next stage button" 103B and a "game termination button" 104B are displayed on the lower image display panel 6.

When the game termination button 104B is touched by a player through the touch panel 11, the bonus game is terminated.

When a bonus game is terminated, the payout amount obtained in the second stage by the player may be doubled.

In the example, on the second stage screen as shown on the middle right position of FIG. 1, the symbols, corresponding to the three treasure boxes 101 which are opened, are "5", "10" and "STRAWBERRY". In other words, a total of "15" is the total amount which the player obtains in the second stage. Therefore, when the player selects to terminate the bonus game, the payout amount may be doubled, becoming to When the next stage button 103B is touched by a player through the touch panel 11, on the lower image display panel 6, the screen of the final stage in which twenty-three treasure boxes 101 are arranged is displayed. Thereby, the game is proceeded to the final stage from the second stage.

Also, in the final stage, as same as in the first stage screen and the second stage screen, a screen showing twenty-three treasure boxes 101 arranged in a close state, is displayed on the lower image display panel 6. In the final stage, three treasure boxes 101 may be selected by a player through the touch panel 11. On the lower image display panel 6, the state of the treasure box 101 selected by the player is changed from a "close" state to an "open" state.

On the lower image display panel 6, the payout amount corresponding to the treasure box 101 which is becomes an open state, is overlapped and displayed on the treasure box 101. And the displayed payout amount is provided to the player. In other words, in the final stage, the selection-type game is also executed as same as in the first stage and the second stage.

However, when the screen of the final stage is displayed on the lower image display panel 6, corresponding to the touch of the next stage button 103B by the player, the state (open/close) of the treasure boxes 101 is preserved while continuing the close and open states of the treasure boxes 101 arranged at the same positions in both the final stage screen and the second stage screen, as shown on the middle right position and lower right position of FIG. 1.

On the second stage screen displayed on the middle right position of FIG. 1, on the three treasure boxes 101 which are opened, symbols of "5", "100" and "STRAWBERRY" are displayed. When the next stage button 103B is touched by the player, the game is proceeded to the final stage from the second stage. The state (open/close) of the treasure boxes 101 on the final stage screen as shown on the lower right position of FIG. 1, is as same as that of the second stage screen as shown on the middle right position of FIG. 1.

On the screen of each stage displayed on the lower image display panel 6, a stage display portion 102 and a payout amount display portion 9 are arranged. On the stage display portion 102, current stage name is displayed. And on the payout amount display portion 9, the payout amount obtained by the player is displayed.

Hereinafter, the embodiment embodying the present invention is described in detail with reference to the drawings.

Figure 2:
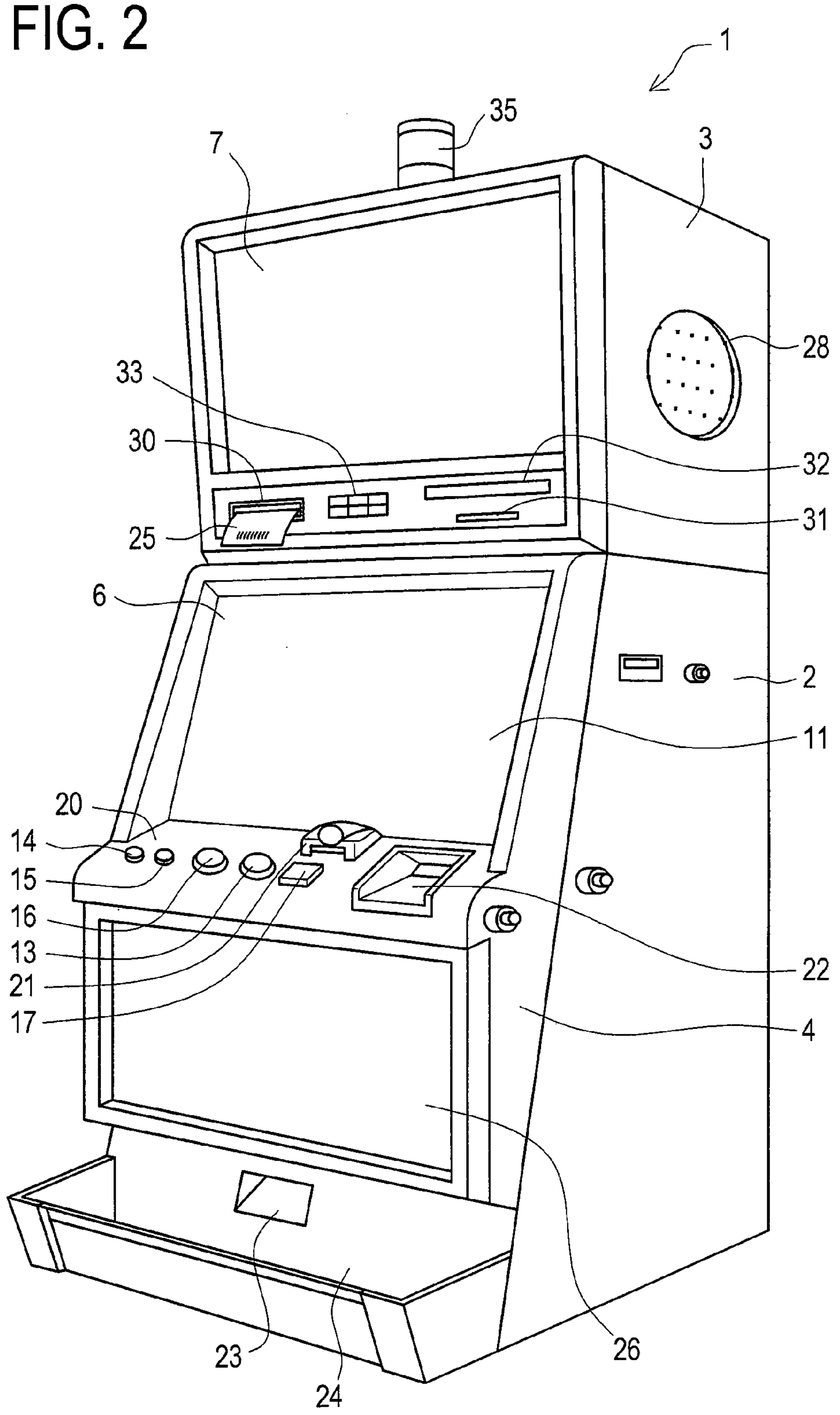
FIG. 2 is a perspective view of the slot machine according to the embodiment.

At first, an outline construction of a slot machine 1 of the embodiment may be described with reference to FIG. 2. FIG. 2 is a perspective view showing the slot machine of the embodiment.

The slot machine 1 includes a cabinet 2, a top box 3, and a main door 4. The top box 3 is arranged on the cabinet 2 (for instance, arranged on upper portion). The main door 4 is arranged in front of the cabinet 2.

In front of the top box 3, an upper image display panel 7 is arranged. Here, the upper image display panel 7 is constructed from well-known liquid crystal panel. On the upper image display panel 7, game information of the slot machine 1, such as demonstration images, game rules and a payout table may be displayed.

A lower image display panel 6 is arranged on the main door 4, as a video display. The lower image display panel may be constructed, for instance, from well-known transparent liquid crystal panel. Here, the lower image display may be CRT, liquid crystal display, plasma display, LED display, OLED display, and other known display technologies.

Figure 6:
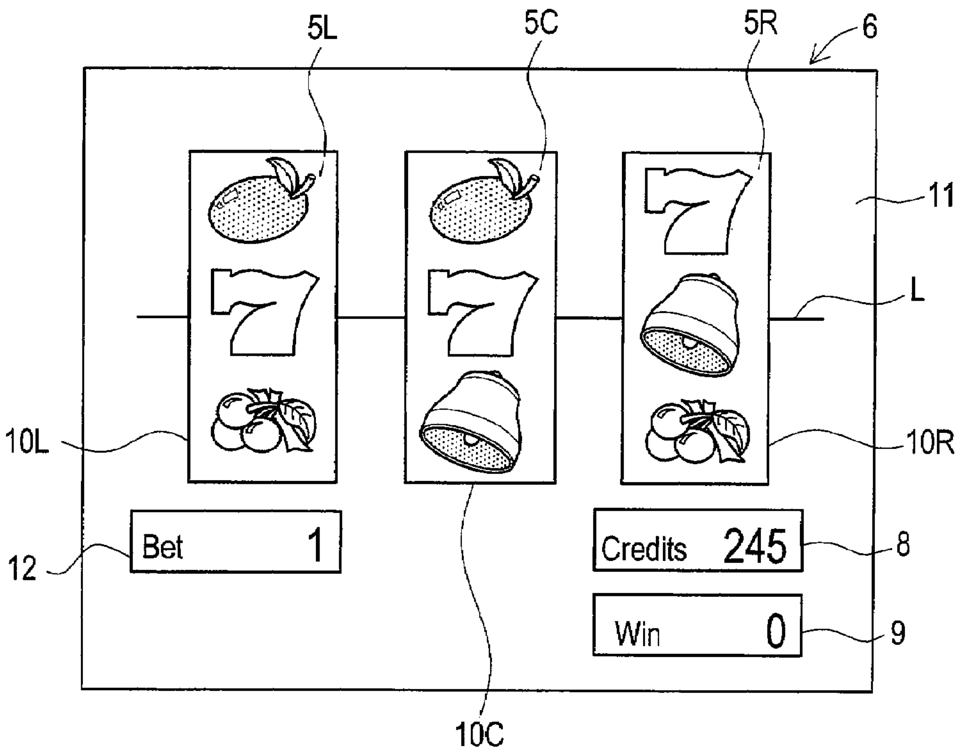
FIG. 6 is an explanatory view showing the content displayed on the lower image display panel in a base game of the slot machine according to the embodiment.
Figure 7:
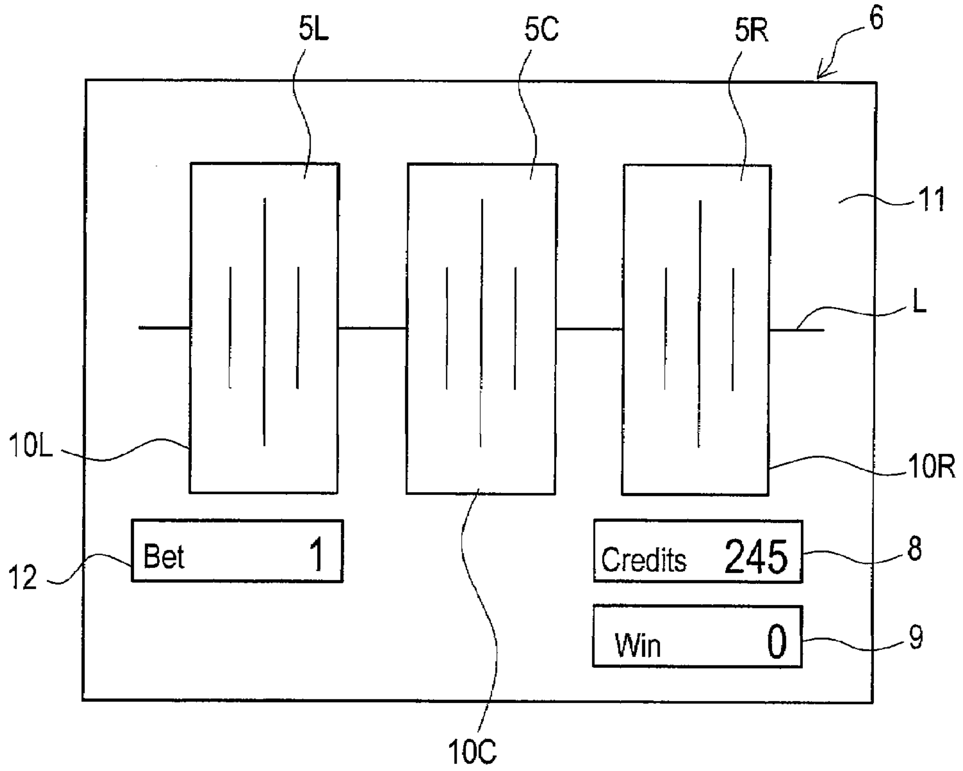
FIG. 7 is an explanatory view showing the content displayed on the lower image display panel in a base game of the slot machine according to the embodiment.

Here, images regarding to a base game of the slot machine 1 displayed on the lower image display panel 6 may be explained. FIG. 6 and FIG. 7 are explanatory views showing the content displayed on the lower image display panel 6. On the lower image display panel 6, in a base game, as shown in FIG. 6 and FIG. 7, the symbols displayed on each reel 5L, 5C and 5R are visible through display windows 10L, 10C and 10R. FIG. 6 is an explanatory view showing the display state of the symbols displayed on each reel 5L, 5C and 5R, wherein the symbols are displayed after being arranged or rearranged on the display windows 10L, 10C and 10R of the lower image display panel 6. FIG. 7 is an explanatory view showing the display state of the symbols displayed on each reel 5L, 5C and 5R, wherein the symbols are rotating on the display windows 10L, 10C and 10R of the lower image display panel 6.

Here, on each reel of the three reels 5L, 5C and 5R, a symbol row (see FIG. 3) constructed from twenty-two symbols is described.

A touch panel 11 is arranged in the front of the lower image display panel 6, and the player may input various instructions by operating the touch panel 11.

A credit number display portion 8, a payout amount display portion 9, and a bet number display portion 12 are arranged on the lower image display panel 6. On the credit number display portion 8, the credit number which a player currently owns may be displayed. On the payout amount display portion 9, the payout amount obtained in a base game (slot game) and a bonus game, may be displayed. On the bet number display portion 12, a bet number betted currently to each base game by the player may be displayed.

On the lower image display panel 6, three visible display windows 10L, 10C and 10R are formed. Three symbols displayed on each of the reels 5L, 5C and 5R may be visible through each of the display windows 10L, 10C and 10R.

On the lower image display panel 6, as shown in FIG. 6 and FIG. 7, a pay line L which horizontally crosses the three display windows 10L, 10C, 10R, is formed. The pay line L may define the combination of the symbols.

In a bonus game, a predetermined bonus screen, wherein the display windows 10L, 10C, 10R (including the reels 5L, 5C and 5R) and the pay line are erased, is displayed concurrently with the payout amount display portion 9.

Returning to FIG. 2, a control panel 20 is arranged at lower position of the lower image display panel 6. Buttons inputting the instructions for gaming session by the player are arranged on the control panel 20. A coin insertion slot 21 and a bill verifier 22 are arranged on the control panel 20. The coin insertion slot 21 may receive the gaming medium into the cabinet 2.

A spin button 13, a change button 14, a cash out button 15, a 1-bet button 16, and a max-bet button 17 are arranged on the control panel 20. The spin button 13 may be used when the instruction for the spinning start of the reels 5L, 5C and 5R is input. The change button 14 is used when the exchange is required by a player. The cash out button 15 is a button to input the instruction for payment of the coin (for example, one credit is equal to one coin) or for printing of a ticket 25. Bar codes may be printed on the ticket 25. The ticket 25 may be called GAMING VOUCHER. The coin may be paid through a coin payout opening 23 to a coin tray 24.

The 1-bet button 16 is used when the instruction is input for betting one credit from all credits owned by the player. The max-bet button 17 is used when the instruction for betting the maximum bet number in a game (for example, fifty credits) from the credits owned by the player is input.

A coin verifier 21S and a coin counter 21C (see FIG. 4) are arranged inside of the coin slot 21. The coin verifier 21S verifies the coin inserted from the coin insertion slot 21, and the fake coins may be discharged through the coin payout opening 23. The coin counter 21C (see FIG. 4) detects qualified coins and numbers the number of the coins.

The bill verifier 22 verifies the bill and receives qualified bill into cabinet 2. The bill which is received into cabinet 2 is converted to the coin number, and the credit number corresponding to the converted coin number may be added to the credit number owned by the player. The bill verifier 22 may read a ticket 25 (which may be described later). A panel 26 is arranged on the main door 4 (for example, arranged on lower portion, namely arranged below the control panel 20). Characters of the slot machine 1 may be displayed on the panel 26.

In the slot machine of the embodiment, the gaming medium may be coin, bill, or electronic value (credit). Here, the gaming medium may be others as well (including but not limited to medal, token, electronic money, or ticket).

A ticket printer 30, a card reader 31, a data display 32, and a keypad 33 are arranged at the lower position of the upper image display panel 7.

The ticket printer 30 prints and outputs the ticket 25 with the bar code in which the data (such as credit number, time data, or ID number of the gaming machine) is coded. A player may use the ticket 25 with the bar code at other gaming machines by reading the ticket through the gaming machine. Also the ticket 25 may be used to go through some procedure in the predetermined place of the game arcade by the player.

The card reader 31 reads data from a smart card and writes data into the smart card. The smart card is owned by a player, and the gaming record of the player is stored in the smart card.

The data display 32 is formed form a luminescent display and the data (which is read by the card reader 31 or input by the player via the keypad 33) may be displayed on the data display 32. The keypad 33 may be used when the player input data or the instruction relating to the print of the ticket. A lamp 35 is arranged at the top box 3 (for example, arranged on top). The lamp 35 may be turned on with a predetermined pattern when the player wants call a clerk of the game arcade, or at the time error occurs in the slot machine 1.

And the symbol 28 indicates a speaker.

Next, with reference to FIG. 3, it will be explained the symbols, which are described on each reel strip adhered to each outer surface of the reels 5L, 5C and 5R and rearranged and displayed through the display windows 10L, 10C and 10R of the lower image display panel 6 during the game after being scrolled. FIG. 3 is a view schematically showing the symbols displayed on each of the reels 5L, 5C and 5R.

On the reel strips of the left reel 5L, the center reel 5C and the right reel 5R, twenty-two symbols are displayed respectively. Each symbol row is formed by combining "RED 7", "BLUE 7", "BELL", "CHERRY", "STRAWBERRY", "PLUM", "APPLE", "ORANGE". As shown in FIG. 3, on each reel strips of the reel 5L, 5C and 5R, predetermined kinds of symbols are arranged with a predetermined sequence.

When three symbols of the "BLUE 7", "BELL", "CHERRY", "STRAWBERRY", "PLUM", "APPLE" and "ORANGE", are rearranged and displayed on the pay line L of the lower image display panel 6, a predetermined payout amount may be provided to the player (see FIG. 5). When one or two symbols of the "CHERRY" and "ORANGE", are rearranged and displayed on the pay line L, a predetermined payout amount may be provided based on the number thereof (see FIG. 5).

When three symbols of the "RED 7" are rearranged and displayed on the pay line L of the lower image display panel 6, a bonus game may be executed in addition to a predetermined payout amount. Here, the game executed in the slot machine 1 according to the embodiment, is constructed from two game modes of a base game and a bonus game. In a base game, a slot game is executed, wherein each of specific symbol combinations is rearranged and displayed on the pay line L, through the reel 5L, 5C and 5R on the lower image display panel 6. Regarding to the bonus game, it may be described later.

A part of the symbol rows displayed on each reel strip of the reels 5L, 5C and 5R shown in FIG. 3, is displayed in the display windows 10L, 10C and 10R. Thereby, in each of the display windows, three symbols are arranged. Thus nine symbols are totally rearranged and displayed in the display windows 10L, 10C and 10R.

When the bet number is determined based on the operation of the 1-bet button 16 or max-bet button 17, and then the spin button 13 is touched, the reels 5L, 5C and 5R may start to spin. Accordingly, the symbol rows displayed on the reels 5L, 5C and 5R, are scrolled from top to bottom in the display windows 10L, 10C and 10R, and then displayed (see FIG. 7).

After a predetermined time, the reels 5L, 5C and 5R may end spinning. Three symbols are shown in each of the display windows. Accordingly, nine symbols are totally rearranged and displayed in the display windows 10L, 10C and 10R (see FIG. 6). Here, winning combinations of the symbols are set beforehand according to symbol combinations (see FIG. 5). If the symbols, which are rearranged and displayed on the pay line L, form a winning combination, the payout amount corresponding to the winning combination displayed on the pay line L may be provided to the player.

Figure 4:
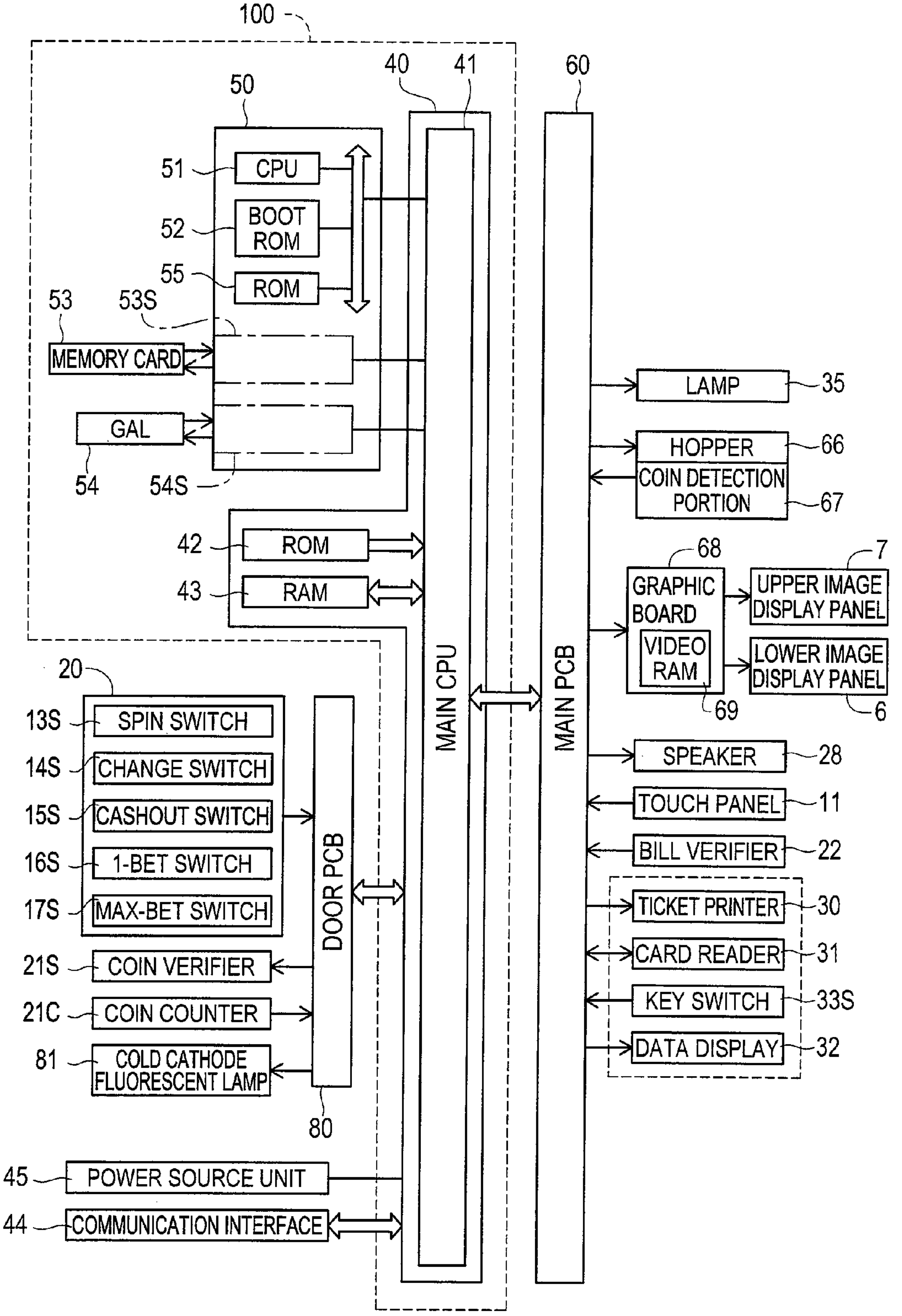
FIG. 4 is a block diagram schematically showing a control system of the slot machine according to the embodiment.

A control system of the slot machine 1 according to the embodiment may be described with reference to FIG. 4. FIG. 4 is a block diagram schematically showing the control system of the slot machine 1 according to the embodiment.

The control system of the slot machine 1 may be constructed from a mother board 40 and a gaming board 50 as shown in FIG. 4. The gaming board 50 may be constructed from a CPU 51, a ROM 55, a boot ROM 52, a card slot 53S, and an IC socket 54S. The CPU 51, the ROM 55, the boot ROM 52 are interconnected via internal bus. The card slot 53S is adapted to receive the memory card 53. The IC socket 54S is adapted to receive a GAL (Generic Array Logic) 54.

The memory card 53 may be constructed from non-volatile memory. A game program and a game system program (hereinafter, "the game program and the like") are stored therein. The game program stored in the memory card 53 may include a lottery program.

The lottery program is used to determine the symbols (code numbers corresponding to the symbols) of each of the reels 5L, 5C and 5R rearranged and displayed on the pay line L. Symbol tables of the base game and the bonus game are included in the lottery program.

In the lottery program, it is included symbol weighing data corresponding to each of plural kinds of payout rates (for example, 80%, 84%, 88%). The symbol weighing data are the data indicating correlation between the code No. (see FIG. 3) of each symbol and one or plural random numbers belonging to a predetermined number range (0 to 255), every each of the three reels 5L, 5C and 5R.

In other words, each of the code No. of one symbol is associated with one or more random numbers. The random number is extracted by the lottery program, and the symbol corresponding to the random number is rearranged and displayed on the lower image display panel 6.

The payout rates are determined based on the payout rate setting data output from the GAL 54. And the lottery is executed based on the symbol weighing data corresponding to the payout rate.

The card slot 53S is constructed so that the memory card 53 is detachable, and is connected to the mother board 40 via bus IDE bus. The kind and the contents of the game executed in the slot machine 1 may be changed by rewriting the game program and the like stored in the memory card 53. Also, the kinds and the contents of the games executed in the slot machine 1 may be changed by exchanging the memory card 53 in which another game program or the like is stored.

The game program may include the program related to the gaming session, the image data and sound data output during the game. Also the image data showing the symbols displayed on each of the three reels 5L, 5C and 5R, the image data of the game rules or the payout table, and the image data for demonstration are included in the game program.

The GAL 54 may be one of the PLD, which may contains a fixed OR array. The GAL 54 includes plural input ports and output ports. If predetermined data is input to the input port(s), the data corresponding thereto may be output to the output port(s). The output data from the output port is the payout rate setting data.

The IC socket 54S is constructed so that the GAL 54 is detachable, and is connected to the mother board 40 via PCI bus. The payout rate setting data may be changed by rewriting the GAL 54 or by exchanging the GAL 54 itself The CPU 51, the ROM 55, and the ROM 52 are connected to the mother board 40 via the PCI bus. The CPU 51, the ROM 55, and the boot ROM 52 are interconnected via internal bus. The PCI bus transmits the signal between the mother board 40 and the gaming board 50. The mother board 40 supplies the electric power to the gaming board 50 by the PCI bus. The ID and the verification program are stored in the ROM 55. The preliminary verification program and the boot code may be stored in the boot ROM 52. The CPU 51 may boot the preliminary verification program with the use of the boot code.

The verification program is used to verify the game program and the like. The verification program is executed to check whether or not falsification of data has been done in the game program and the like. The game program and the like may be the object of the verification process. A preliminary verification program may be used to verify the verification program. The preliminary verification program is written along the procedure for the check of falsification of the verification program. The verification program may be the object of the preliminary verification process.

The mother board 40 may be described. The mother board 40 may be constructed from general mother board (printed circuit board which mounts basic components of a personal computer), and may include a main CPU 41, a ROM 42 and a RAM 43.

The ROM 42 may be constructed from a memory device such as the flash memory (for example). The perpetual data such as BIOS program, the lottery tables in the base game and in the bonus game and the payout table (see FIG. 5) may be stored in the ROM 42. The BIOS program may be executed by the main CPU 41. When the BIOS is executed by the main CPU 41, the initial process for predetermined peripheral devices, and the read process for the game program and the like stored in the memory card 53 may be started via the gaming board 50.

The data and the program, which are used when the main CPU 41 runs, are stored in the RAM 43. The verification program which may be read via the gaming board 50, various programs such as the game program and the like, the credits number owned by the player may be stored in the RAM 43. Also in the RAM 43, the memory area regarding to the after-mentioned variable N or M is stored.

Figure 17:
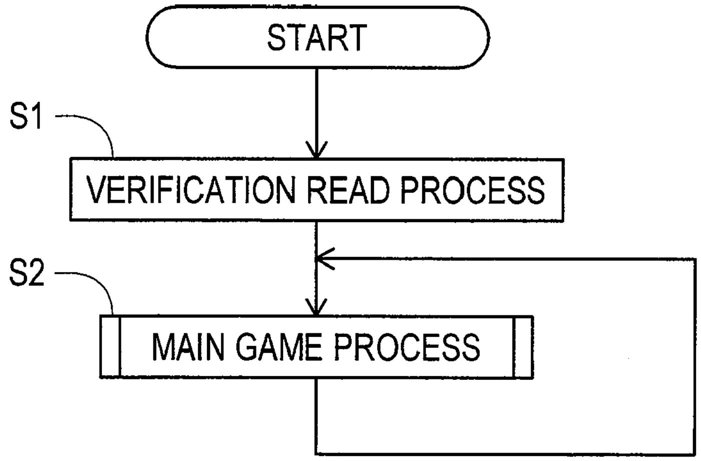
FIG. 17 is a flowchart of a main control program in the slot machine according to the embodiment.

A communication interface 44 is connected to the mother board 40. The communication interface 44 may be a communication device communicating with the server located in the game arcade via a communication line or other communication pathway. In the slot machine 1, bet information in the main game process (which may be described later, see S2 of FIG. 17) and/or the lottery result of a base game lottery process may be communicated with the server via the communication interface 44.

A main PCB (Printed Circuit Board) 60 and a door PCB 80 (which may be described later) are connected to the mother board 40 respectively via USB (for example). When the power source unit 45 supplies the electric power to the mother board 40, the main CPU 41 on the mother board 40 may be booted up. The CPU 51 may be booted up by supplying the electric power to the gaming board 50.

A game controller 100 is constructed from the mother board 40 and the gaming board 50.

To the main PCB 60 and the door PCB 80, devices generating the input signals to the game controller 100 and devices controlled by the control signals from the game controller 100, are connected. The game controller 100 executes the game program and the like stored in the RAM 43 based on the input signal which is input thereto. The CPU 41 stores the calculation result in the RAM 43 and controls some devices by executing predetermined calculation process.

The lamp 35, a hopper 66, a coin detection portion 67, a graphic board 68, the speaker 28, a touch panel 11, the bill verifier 22, the ticket printer 30, the card reader 31, a key switch 33S, and a data display 32 may be connected directly or indirectly to the main PCB 60.

The touch panel 11 may be arranged in front of the lower image display panel 6. The touch panel 11 may specify the coordinate information of the portion touched by the player. And based on the specified coordinate information, the touch panel 11 may realize where the player touches, and the direction of the movement corresponding to the portion touched by the player.

The hopper 66 is arranged inside of the cabinet 2. The hopper 66 pays out coins through the coin payout opening 23 to the coin tray 24 based on the control signal from the game controller 100. The coin detection portion 67 is arranged inside of the coin payout opening 23. When the coin detection portion 67 detects that predetermined coins are paid through the coin payout opening 23, the coin detection portion 67 may output the signal to the game controller 100.

The graphic board 68 controls the image display on the upper image display panel 7 and the lower image display panel 6 based on the control signal from the game controller 100. The player's credit number, stored in the RAM 43, may be displayed on the credit number display portion 8. The credit amount corresponding to the payout may be displayed on the payout number display portions 9.

The graphic board 68 may include a VDP (Video Display Processor) and a video RAM 69. The VDP is used to generate image data based on the control signals from the game controller 100. The image data generated by the VDP are temporarily stored in the video RAM 69. The image data to generate the image data by the VDP may be included in the game program.

Also, the display control is executed by the graphic board 68, based on the control signals from the game controller 100, so that the reels 5L, 5C and 5R are variably rotated and stopped on the lower image display panel 6.

The bill verifier 22 verifies the bill or the ticket 25 with bar code. The bill verifier 22 receives the qualified bill or the ticket 25 with bar code into the cabinet 2. When qualified bill is inserted, the bill verifier 22 may output signals to the game controller 100 based on the value thereof. When qualified ticket 25 is inserted, the bill verifier 22 may output signals to the game controller 100 based on the bar code indicating the number of coins printed thereon.

The ticket printer 30 prints the ticket with the bar code, in which the data such as credit number stored in the RAM 43 are coded, based on the control signal from the game controller 100. The ticket printer 30 outputs the printed ticket as the ticket 25 with bar code.

The card reader 31 reads data from the smart card, and transmits data to the game controller 100, based on the control signals from the game controller 100. A key switch 33S is arranged on the keypad 33. When the keypad 33 is operated by the player, the predetermined input signal may be output to the game controller 100. On the data display 32, the data read by the card reader 31 or the data input by the player via the keypad 33, may be displayed based on the control signal from the game controller 100.

The control panel 20, the coin verifier 21S, the coin counter 21C, and a cold cathode fluorescent lamp 81 are directly or indirectly connected to the door PCB 80. A spin switch 13S, a change switch 14S, a cash-out switch 15S, a 1-bet switch 16S, and a max-bet switch 17S are arranged on the control panel 20. The spin switch 13S is associated with the spin button 13. The change switch 14S is associated with the change button 14. The cash-out switch 15S is associated with the cash-out button 15. The 1-bet switch 16S is associated with the 1-bet button 16. The max-bet switch 17S is associated with the max-bet button 17. Each of the switches may output the input signal to the game controller 100 when the button corresponding thereof is operated by the player.

The coin counter 21C is arranged inside of the coin insertion slot 21. The coin counter 21C verifies the coin inserted from the coin insertion slot 21 by the player. Any fake coin may be discharged through the coin payout opening 23. When a qualified coin is detected, the coin counter 21C may output the signal to the game controller 100.

The coin verifier 21S is controlled based on the control signal from the game controller 100. The coin verifier 21S sorts the qualified coins into a cash box (not shown) or the hopper 66. The cash box is arranged inside of the slot machine 1. The cold cathode fluorescent lamp 81 may be arranged on the back side of the lower image display panel 6 and the upper image display panel 7. The cold cathode fluorescent lamp 81 functions as a back light and is turned on based on the control signal from the game controller 100.

The winning combination and payout thereof in the base game by using the reels 5L, 5C and 5R in the slot machine 1 of the embodiment, may be described with reference to FIG. 5. FIG. 5 is a payout table showing the winning combinations and the payouts corresponding to the winning combinations in the base game using the reels 5L, 5C and 5R.

The payout amount shown in FIG. 5 indicates the case in which the bet number is "1". When the bet number is "1", the payout amount shown in FIG. 5 may be added to the credit number. When the bet number is more than "2", the product obtained by multiplying the payout amount shown in FIG. 5 with the bet number, may be added to the credit number.

For example, when a bonus trigger is realized on the lower image display panel 6, three symbols of "RED 7" are rearranged and displayed on the pay line L, and a payout of 10 credits per bet may be provided to the player. Also, the bonus game is started.

When a winning combination of symbols "BLUE 7" is realized, on the lower image display panel 6, three "BLUE 7" symbols are rearranged and displayed on the pay line L, and a payout of 10 credits per bet may be provided to the player.

When a winning combination of symbols "BELL" is realized, on the lower image display panel 6, three "BELL" symbols are rearranged and displayed on the pay line L, and a payout of 8 credits per bet may be provided to the player.

Similar to the above, as shown in FIG. 5, the probability to realize the winning combination and the payout thereof are set every each winning combination. However, when it is rearranged and displayed on the lower image display panel 6 a symbol combination other than the winning combinations shown in FIG. 5, the game result becomes loss of game. In this case, no credit is paid out.

Figure 9:
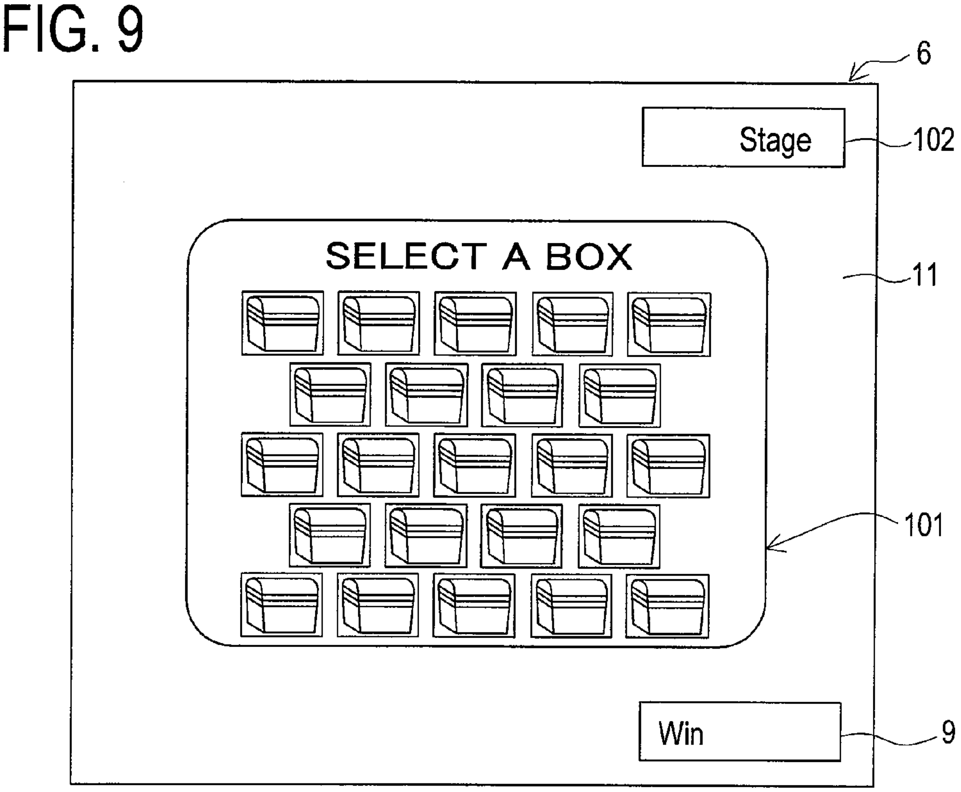
FIG. 9 is an explanatory view showing an initial screen of each stage displayed on the lower image display panel in the bonus game of the slot machine according to the embodiment.

Next, a bonus game may be described. A bonus game is constructed from three stages of the first stage, the second stage and the final stage. FIG. 9 is a view showing an initial screen of each stage displayed on the lower image display panel 6. As shown in FIG. 9, on the initial screen of each stage displayed on the lower image display panel 6, twenty-three treasure boxes 101, the stage display portion 102 and the payout amount display portion 9 are arranged. The twenty-three treasure boxes 101 are shown in a close state. The stage display portion 102 shows the name of the current stage. And the payout amount display portion 9 shows the payout amount obtained by the player.

Figure 10:
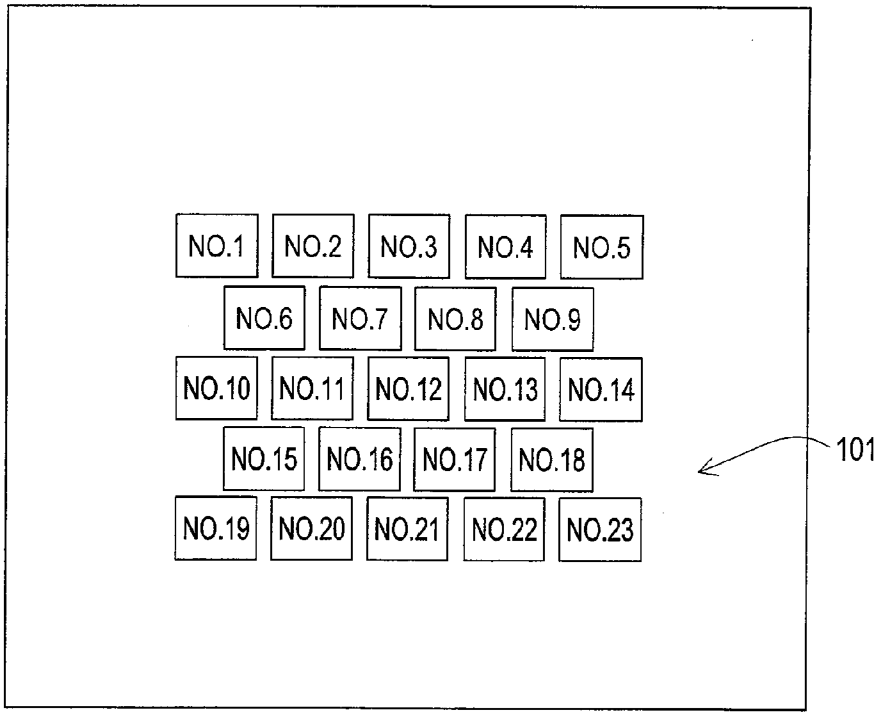
FIG. 10 is an explanatory view showing an example of numbering for each treasure box in the bonus game of the slot machine according to the embodiment.

Regarding the twenty-three treasure box 101, numbering which may be used commonly in the initial screen of each stage, is executed preliminarily. In FIG. 10, an example of the numbering of each treasure box 101 is shown. By using the numbering of each treasure box 101, selection item tables in each of which the content and the state regarding the twenty-three treasure box 101 are associated for each stage, are stored in the RAM 43.

FIG. 11 and FIG. 14 are views showing examples of selection item table of the first stage. In the selection item tables as shown in FIG. 11 and FIG. 14, the number of each treasure box 101, which is determined in the numbering, is stored in the data item of the "treasure box", the payout amount corresponding to each treasure box 101 is stored in the data item of the "content", and the data indicating whether each treasure box 101 is close or opened are stored in the data item of the "state". Here, the payout amount as the content of each treasure box 101, is one of "5 ", "10", "20", "30", "40", "50", "60", "70", "80", "100", "200". The payout amount of each treasure box 101 is determined based on the lottery result in the beginning of a game.

In the FIG. 11 and FIG. 14, regarding the data item in the "state", the data with "X" indicates that the treasure box 101 is close, while the data item in the "state" with "O" indicates that the treasure box 101 is opened. Regarding this item, it is also the same in the selection item table of the second stage and the selection item table of the final stage.

FIG. 12 is a view showing an example of the selection item table for the second stage. As shown in FIG. 12, the selection item table of the second stage has the same construction as that of the first stage. However, for the content of each treasure box, the symbols of "STRAWBERRY" and "BELL" are stored instead of the payout amount "200".

FIG. 13 is a view showing an example of the selection item table for the final stage. As shown in FIG. 13, the selection item table of the final stage has the same construction as that of the first stage.

A bonus game is a selection-type game. Here, a typical example of the bonus game may be explained.

In a bonus game, on the screen of each stage displayed on the lower image display panel 6, when any treasure box 101 which is in a close state is selected by the player through the touch panel 11, the treasure box 101 which is selected by the player may be changed to an open state from a close state, the content corresponding to the treasure box 101 which becomes an open state, is overlapped and displayed on the treasure box 101.

When the content corresponding to the treasure box 101 which becomes to an open state, is a payout amount, the displayed payout amount is provided to the player, and the payout amount may be added to the payout amount display portion 9. And then the player may select another treasure box 101 which is in a close state. The selection may be conducted three times in the first stage and the final stage without any condition. However, in the second stage, under a condition that none of the symbols “BELL” and “STRAWBERRY” is displayed on the screen as the “content” of the treasure box 101, the selection may be conducted three times.

When the third selection is conducted, the game proceeds to the next stage. Then on the lower image display panel 6, the screen of the next stage is displayed. And on the screen of this stage, the first time selection may be conducted. The renewal of the stage is conducted in a sequence of the first stage, the second stage and the final stage.

In each stage, when the treasure box 101 changes from a close state to an open state, in the selection item table corresponding to the stage, the data item in the “state” may be rewritten from “X” to “O”, in accordance with the state change of a treasure box from a close state to an open state. On the stage screen of the final stage, when the third selection is conducted, the bonus game is terminated.

Figure 8:
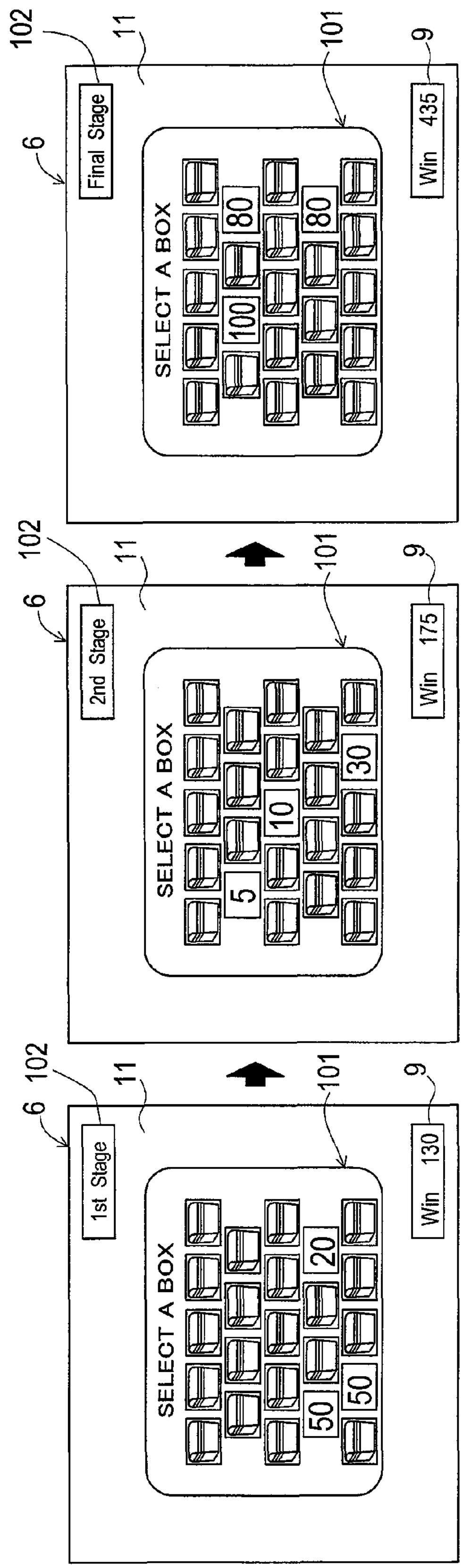
FIG. 8 is an explanatory view showing a typical example of the bonus game executed in the slot machine according to the embodiment.

FIG. 8 is a view showing the typical example of the bonus game conducted in the slot machine 1 according to the embodiment. When the bonus game is started, on the lower image display panel 6, the first stage screen with “1st” shown on the stage display portion 102 is displayed. After three treasure boxes 101 are selected by the player by touching the touch panel 11, the three selected treasure boxes 101 are changed to an open state. On the screen of the first stage displayed on the left position of FIG. 8, as the contents corresponded to three treasure boxes 101 selected by the player touching them through the touch panel 11, each of the payouts (“50”, “20”, “50”) is overlapped and displayed on each of the treasure boxes 101 which are in an open state. And the above payout amount is added and displayed on the payout amount display portion 9. And after the treasure boxes 101 are selected by the player three times, the game proceeds to the second stage.

When the second stage is started, on the lower image display panel 6, the second stage screen with “2nd” shown on the stage display portion 102 is displayed. After the three treasure boxes 101 are selected by the player by touching the touch panel 11, the three treasure boxes 101 are changed to an open state. And on the screen of the second stage displayed on the middle position of FIG. 8, as the contents corresponded to three treasure boxes 101 selected by the player touching them through the touch panel 11, each of the payouts (“5”, “10”, “30”) is overlapped and displayed on each of the treasure boxes 101 which are in an open state. And the payout amount of “5”, “10” and “30” is added to and displayed in the payout amount display portion 9. And after the treasure boxes 101 are selected by the player three times, the game proceeds to the final stage.

When the final stage is started, on the lower image display panel 6, the screen of the final stage with “Final” shown in the stage display portion 102 is displayed. After the three treasure boxes 101 are selected by the player by touching the touch panel 11, the three treasure boxes 101 are changed to an open state. And on the screen of the second stage displayed on the right position of FIG. 8, as the contents corresponded to three treasure boxes 101 selected by the player touching them through the touch panel 11, each of the payouts (“100”, “80”, “80”) is overlapped and displayed on each of the treasure boxes 101 which are in an open state. And the payout amount of “100”, “80” and “80” are added to and displayed on the payout amount display portion 9. And after the treasure boxes 101 are selected by the player three times, the game is terminated.

Figure 15:
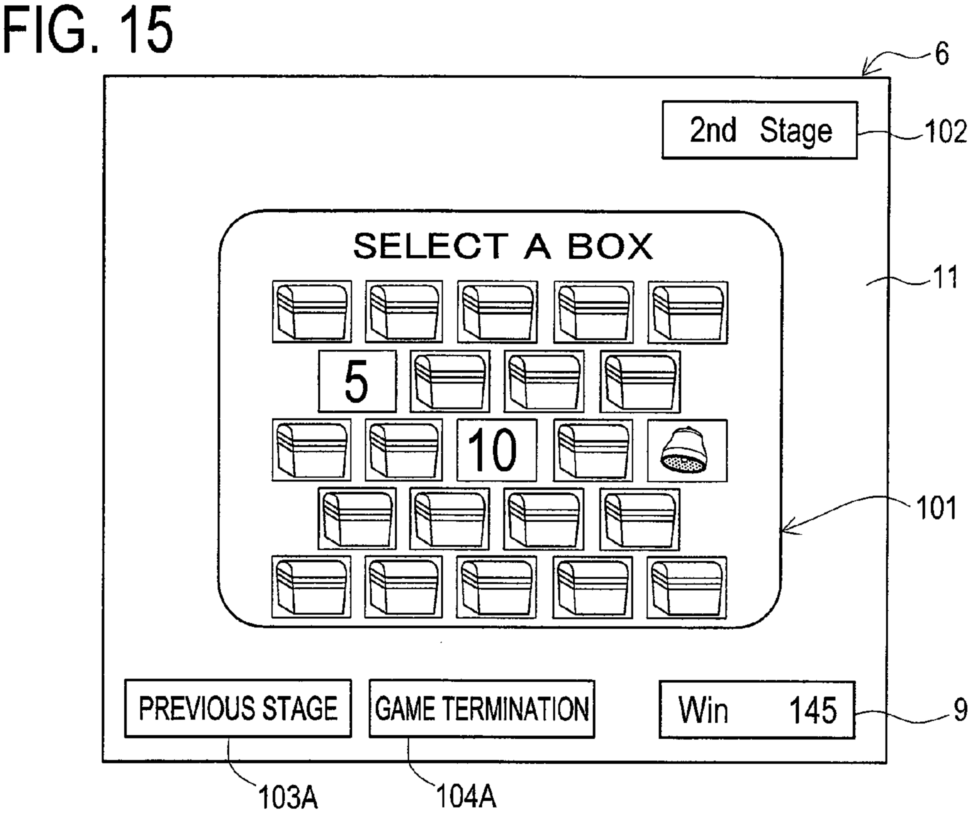
FIG. 15 is an explanatory view showing the first branched screen of the second stage in the bonus game according to the embodiment.

In a bonus game, on the screen of the second stage displayed on the lower image display panel 6, when, as the content of the treasure box 101 selected by the player through the touch panel 11, a “BELL” symbol is overlapped and displayed in the treasure box 101 which is in an open state, the previous state button 103A and the game termination button 104A are displayed, as shown in FIG. 15. FIG. 15 is a view showing the first branched screen of the second stage.

Regarding the steps thereafter, it is same as those mentioned above with reference to FIG. 1. When the game termination button 104A is touched by a player through the touch panel 11, the bonus game is terminated.

When the previous stage button 103A is touched by a player through the touch panel 11, on the lower image display panel 6, the screen of the first stage in which twenty-three treasure boxes 101 are arranged is displayed again. Thereby, the game is returned to the first stage from the second stage. However, when the screen of the first stage is displayed again on the lower image display panel 6 corresponding to the touch of the previous stage button 103A by the player, the state (open/close) is preserved based on the selection item table of the second stage mentioned in the above while continuing the close and open states of the treasure boxes 101 arranged at the same positions in both the second state screen and the first stage screen, as shown on the middle left position and lower left position of FIG. 1.

On the second stage screen displayed on the middle left position of FIG. 1, symbols of “5”, “10” and “BELL” are displayed on the position of the three treasure boxes 101 which are opened. However, when the game is returned to the first stage from the second stage based on that the player touches the previous stage button 103A, the open and close states of each treasure box 101 on the first stage screen becomes the same as those on the second stage shown on the middle left position of FIG. 1, as shown on the lower left position of FIG. 1.

When the game returns from the second stage to the first stage, the payout amount which is obtained by the player in the second stage may be cut to a half (round off to the nearest whole number).

In the example, on the second stage screen as shown on the middle left position of FIG. 1, the symbols, corresponding to the three treasure boxes 101 which are opened, are “5”, “10” and “BELL”. In other words, it concludes that the player obtains the total amount of “15” in the second stage. Therefore, the total amount of “15” obtained in the second stage is cut to a half at the time that the bonus game returns to the first stage and becomes “8”.

Figure 16:
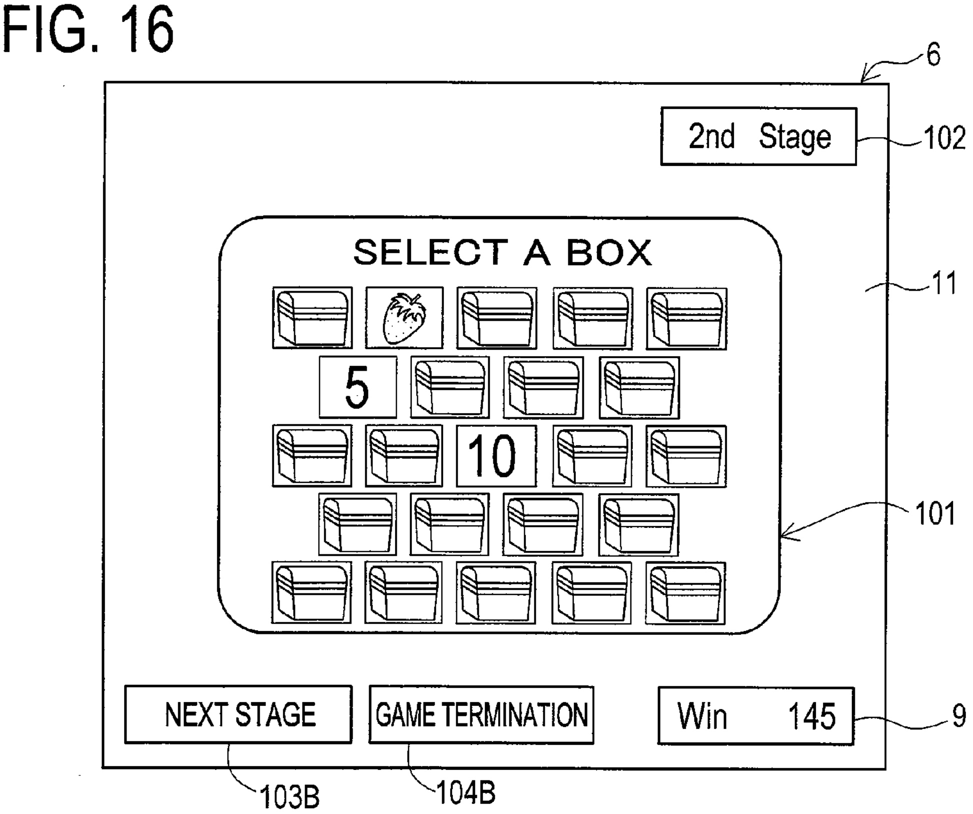
FIG. 16 is an explanatory view showing the second branched screen of the second stage in the bonus game according to the embodiment.

Meanwhile, on the second stage screen on the lower image display panel 6, when the symbol of “STRAWBERRY” is overlapped and displayed on the treasure box 101 which is selected by the player and opened, a “next stage button” 103B and a “game termination button” 104B are displayed on the lower image display panel 6 as shown in FIG. 16. FIG. 16 is a view showing the second branched screen of the second stage.

The processes thereafter are the same as those explained with reference to FIG. 1. When the game termination button 104B is touched by the player through the touch panel 11, the bonus game is terminated.

When the bonus game is terminated, the payout amount obtained in the second stage by the player may be doubled.

In the example, on the second stage screen as shown on the middle right position of FIG. 1, the symbols corresponding to the three treasure boxes 101 which are opened, are "5", "10" and "STRAWBERRY". In other words, it concludes that the player obtains the total amount of "15" in the second stage. Therefore, the total amount of "15" obtained in the second stage is doubled at the time that the bonus game terminates and becomes "30".

When the next stage button 103B is touched by the player through the touch panel 11, on the lower image display panel 6, the screen of the final stage in which twenty-three treasure boxes 101 are arranged is displayed. Thereby, the game is proceeded to the final stage from the second stage. When the screen of the final stage is displayed on the lower image display panel 6 corresponding to the touch of the next stage button 103B by the player, the state (open/close) is preserved based on the selection item table of the second stage mentioned in the above while continuing the close and open states of the treasure boxes 101 arranged at the same positions in both the final state screen and the second stage screen, as shown on the middle right position and lower right position of FIG. 1.

On the second stage screen displayed on the middle right position of FIG. 1, symbols of "5", "100" and "STRAWBERRY" are displayed on the position of the three treasure boxes 101 which are opened. However, when the game is proceeded to the final stage form the second stage based on that the player touches the next stage button 103B, the open and close states of each treasure box 101 on the final stage screen becomes the same as those on the second stage shown on the middle right position of FIG. 1, as shown on the lower right position of FIG. 1.

A main control program, which is executed in the slot machine 1 according to the embodiment, will be described in detail with reference to the drawing. FIG. 8 is a flowchart of the main control program.

In the slot machine 1, the memory card 53 is connected to the card slot 53S of the gaming board 50, and the GAL 54 is connected to the IC socket 54S.

When the power switch of the power source unit 45 is ON, the game controller 100 is booted-up, and the verification read process (S1) is executed. In the verification read process, the mother board 40 and the gaming board 50 execute separate processes in parallel.

In the gaming board 50, the CPU 51 reads the preliminary verification program from the boot ROM 52, and verifies that the verification program is not falsified before the verification program is taken to the mother board 40.

In the mother board 40, the main CPU 41 executes BIOS stored in the ROM 42. BIOS may decompress the compressed data therein, and copy it to the RAM 43. When the BIOS stored in the RAM 43 is executed, the check and initialization of various peripheral devices may be executed.

The game controller 100 reads the verification program stored in the ROM 55, and verifies that game program and the like stored in the memory card 53 are not falsified. After the verification process is ended, the game controller 100 writes program to the RAM 43, and acquires payout rate setting data and country ID information.

After the process mentioned above is finished, the game controller 100 finishes the verification read process.

In S2, the game controller 100 reads the game program and the like which was verified in S1 from the RAM 43, and executes the main game process. The game in the slot machine 1 according to the embodiment is executed by executing the main game process. The main game process is executed repeatedly during the period when the electronic power source is supplied.

Figure 18:
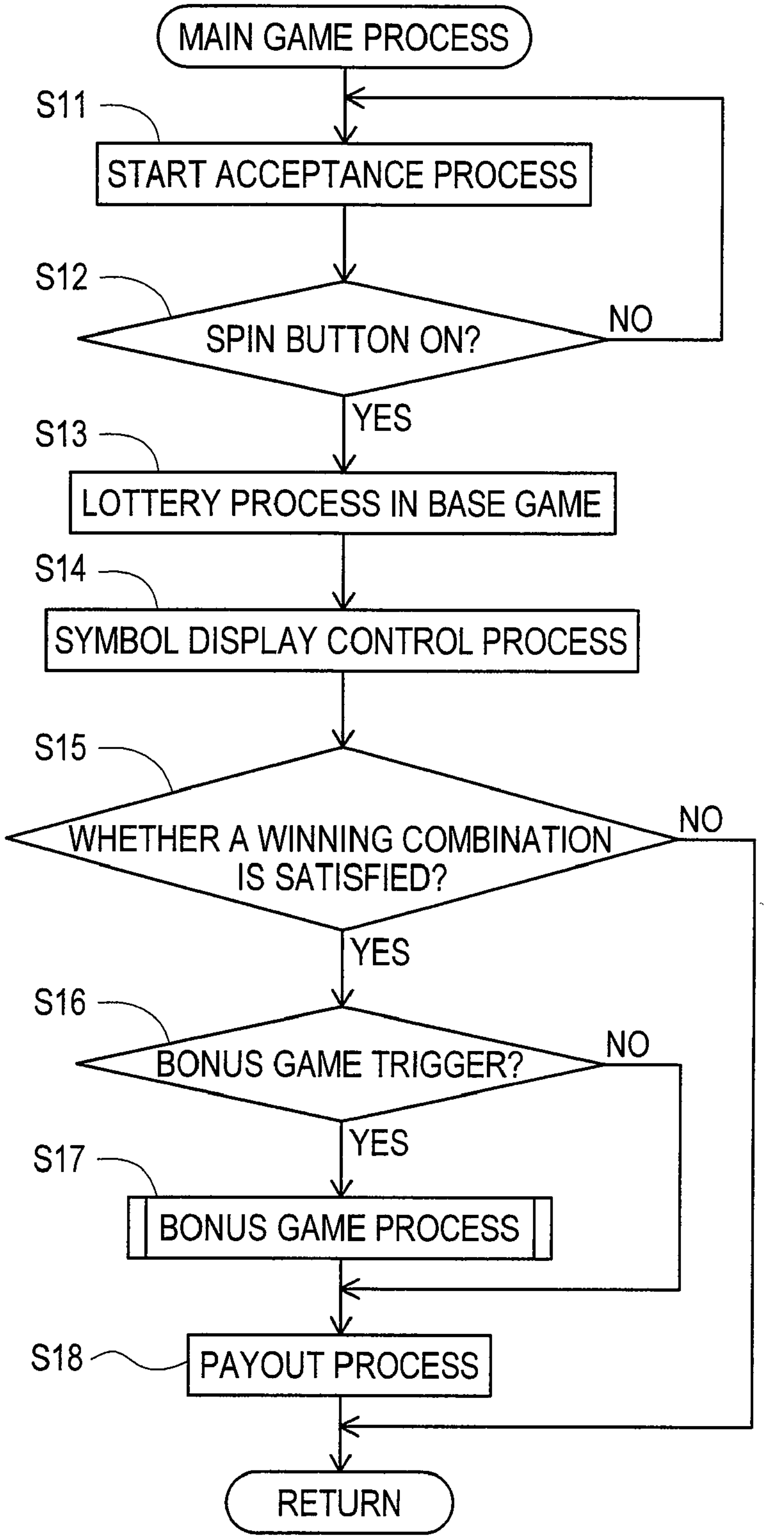
FIG. 18 is a flowchart of a main game process program in the slot machine according to the embodiment.

A sub-process of the main game process in S2 will be described with reference to FIG. 18. FIG. 18 is a flowchart of the main game process in the slot machine 1 according to the embodiment. Here, each of the programs shown in the flowcharts in FIG. 18 is stored in the ROM 42 and the RAM 43 included in the slot machine 1, and is executed by the game controller 100.

In S11 as shown in FIG. 18, the game controller 100 performs predetermined initial setting, and then, executes the start acceptance process such as the insertion of coins and the setting of the bet number. Here, in the start acceptance process, insertion of coins or the bet operation by using the 1-bet button 16 or max-bet button 17, is operated by the player.

In S12, it is determined whether the spin button 13 is operated by the game controller 100. Whether the spin button 13 is operated is determined based on whether the input signal is received.

When the spin button 13 is not operated (S12: NO), the procedure may be returned to the start acceptance process (S11) again. At this time, some instructions such as changing the bet number are available. On the other hand, when the spin button 13 is operated (S12: YES), the bet number, which is set for the pay line L based on the operation of 1-bet button 16 or max-bet button 17, may be subtracted from credit number owned by the player. And, the bet number may be stored in RAM 43 as the bet information.

In S13, the game controller 100 executes the base game with the use of the reels 5L, 5C and 5R.

The game controller 100 executes lottery process in a base game.

Concretely, the random number generation program is included in the lottery program stored in the RAM 43. When the random number generation program is executed, each random number of the three reels 5L, 5C and 5R is generated from the predetermined range of the random number ("0" to "255"). With reference to the symbol weighing data corresponding to the payout rate setting data, each code number of reel 5L, 5C and 5R (see FIG. 3) is determined based on three random numbers which are selected. After the determined code numbers of reels 5L, 5C and 5R are stored in RAM 43, the procedure is shifted to S16.

Here, the code numbers of the reels 5L, 5C and 5R correspond to the code numbers of the symbols stopped and displayed on the pay line L. Therefore, the symbol combination in current game is determined based on the code numbers of the reels 5L, 5C and 5R determined by the game controller 100. For example, if it is determined that the numbers of each of the reels 5L, 5C and 5R are "21", "21", and "21", the symbol combination may be determined as a winning combination of the "RED7" by the game controller 100. In this way, the lottery for the symbol combination (see FIG. 5) is conducted by determining the code numbers of the reels 5L, 5C and 5R.

In S14, the game controller 100 executes symbol display control process.

In the symbol display control process, spinning reels 5L, 5C and 5R may be stopped so that the symbols corresponding to determined combination of symbols in the base game lottery process (S13) are stopped and displayed on the pay line L. The symbol display control process is executed by the game controller 100 and the graphic board 68.

Concretely, in the symbol display control process (S14), the game controller 100 transmits the start signal to the graphic board 68. The start signal instructs to start the reel spin. When the graphic board 68 receives the start signal, the graphic board 68 executes the reel spin and display process. Namely, the graphic board 68 executes the display control to start the reel spin and display process of each reel 5L, 5C and 5R, on the lower image display panel 6.

After the start signal is transmitted, the game controller 100 determines an effect pattern (for example, the image display on the upper image display panel 7 and sounds output from the speaker 28), and the determined effect pattern may be conducted.

When it comes the predetermined timing in which the reels 5L, 5C and 5R are to be stopped, the game controller 100 may transmit the code numbers of the reels stored in the RAM 43 to the graphic board 68. The graphic board 68 executes the reel stop process based on the code numbers of the reels. Accordingly, the symbols corresponding to the lottery result in S13 may be stopped and displayed in the each of the display windows 10L, 10C and 10R on the lower image display panel 6.

In S15, it is determined whether a winning combination is realized by the game controller 100. The determination is made based on the result stored in the RAM 43 in above S13. Here, when it is determined that a winning combination is realized (S15: YES), the payout amount corresponding to the winning combination may be stored in the RAM 43 as payout information by the game controller 100. The payout amount may be added to the payout amount display portion 9 by outputting the display control signals to the graphic board 68. And then procedure shifts to S16. When it is determined that a winning combination is not realized (S15: NO), the program may be executed again.

In S16, it is determined whether a bonus game trigger in a base game is realized. Concretely, when the payout table shown in FIG. 5 is used, if a symbol combination of "Red 7" is rearranged and displayed on the pay line L on the lower image display panel 6, it is determined that the bonus game trigger is realized.

When it is determined that the bonus game trigger is realized (S16: YES), the bonus game process is executed by the game controller 10 in S17.

Figure 19:
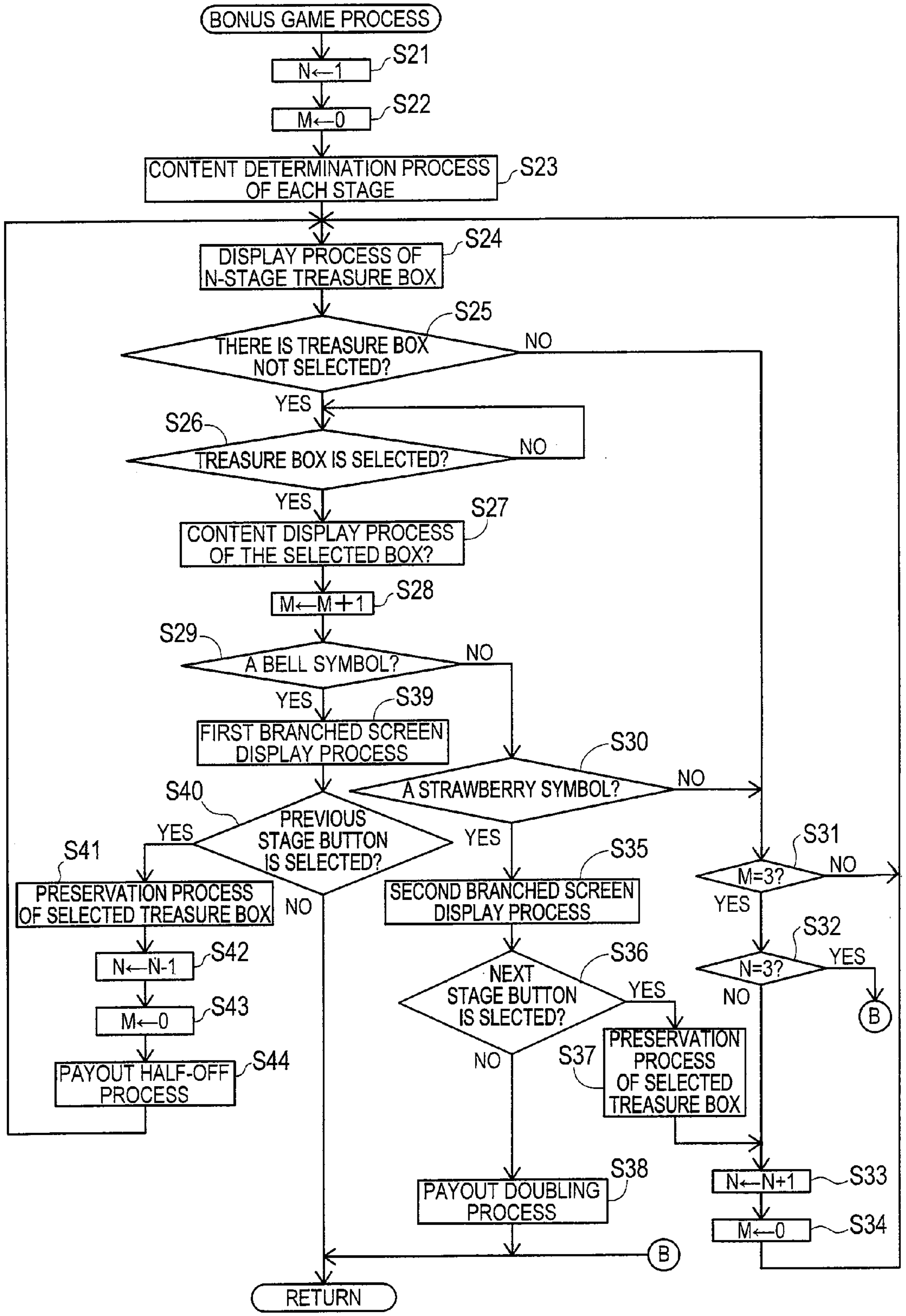
FIG. 19 is a flowchart of a bonus game process program in the slot machine according to the embodiment.

Here, the sub-process of the bonus game process in S17 will be described with reference to FIG. 19. FIG. 19 is a flowchart of a bonus game process program in the slot machine according to the embodiment. Each program shown in the flowchart of FIG. 19 is stored in the ROM 42 or the RAM 43 of the slot machine 1, and is executed by the game controller 100.

As shown in FIG. 19, in S21, the variable N stored in the RAM 43 is stored as "1" by the game controller 100. While, in S22, the variable M stored in the RAM 43 is stored as "0" by the game controller 100.

In S23, the content determination process of each stage may be executed by the game controller 100. In this process, the contents of twenty-three treasure boxes 101 displayed on the screens of the first stage, the second stage and the final stage, may be determined. And the result of the determination may be stored in the selection item table of each stage (see FIG. 11 to FIG. 14).

Next, the determination of the contents corresponding to the twenty-three treasure boxes 101 displayed on the screen in each of the first stage and the final stage, may be explained. Each payout amount of "5", "10", "20", "30", "40", "50", "60", "70", "80", "100", "200", is preliminarily associated with one or more random numbers in a predetermined range. The random number generation program included in the lottery program stored in the RAM 43, is executed by the game controller 100, so that one random number, which may reflect on one of plural payout rates (for example, 80%, 84% and 88%), may be extracted from a predetermined range.

Based on the accordance between the extracted random number and the random number corresponding to each payout amount, the content of a treasure box 101 is determined by the game controller 100. The determined content may be stored in the data item of the "content" corresponding to the treasure box 101 in the selection item table stored in the RAM 43 by the game controller 100 (see FIG. 11, FIG. 13 and FIG. 14). The content determination process may be executed for the contents of all the treasure boxes 101 on each stage screen in the first stage and the final stage.

The determination of the content corresponding to the twenty-three treasure boxes 101 displayed on the screen of the second stage may be explained. Each treasure box 101 is preliminarily associated with one or more random numbers in a predetermined range. The random number generation program included in the lottery program stored in the RAM 43, is executed by the game controller 100, so that one random number, which may reflect on each of plural payout rates (for example, 80%, 84% and 88%), may be extracted from a predetermined range.

Based on the accordance between the extracted random number and the random number corresponding to each payout amount, a treasure box 101 with a symbol of "BELL" as the content is determined by the game controller 100. A "BELL" symbol may be stored in the data item of the "content" corresponding to the determined treasure box 101 in the selection item table stored in the RAM 43 by the game controller 100.

The random number generation program included in the lottery program stored in the RAM 43, is executed by the game controller 100, so that one random number, which may reflect on each of plural payout rates (for example, 80%, 84% and 88%), may be extracted from a predetermined range.

Based on the accordance between the extracted random number and the random number corresponding to each payout amount, a treasure box 101 with a symbol of "STRAWBERRY" as the content is determined by the game controller 100. A "STRAWBERRY" symbol may be stored in the data item of the "content" corresponding to the determined treasure box 101 in the selection item table stored in the RAM 43 by the game controller 100. However, if the treasure box 101 corresponding to the symbol "BELL" is the same as that corresponding to the symbol "STRAWBERRY", the content determination process may be started over by the game controller 100.

Each payout amount of "5", "10", "20", "30", "40", "50", "60", "70", "80", "100", is preliminarily associated with one or more random numbers in a predetermined range. The random number generation program included in the lottery program stored in the RAM 43, is executed by the game controller 100, so that one random number, which may reflect on each of plural payout rates (for example, 80%, 84% and 88%), may be extracted from a predetermined range.

Based on the accordance between the extracted random number and the random number corresponding to each payout amount, the content of a treasure box 101 is determined by the game controller 100. The determined content may be stored in the data item of the "content" corresponding to the treasure box 101 in the selection item table stored in the RAM 43 by the game controller 100 (see FIG. 12). The content determination process may be executed to determine the contents of the twenty-one treasure boxes 101 except those corresponding to the symbol "BELL" and the symbol "STRAWBERRY" in the second stage among the twenty-three treasure boxes 101.

In S24, the display process of the N stage treasure box is executed by the game controller 100. When the variable N is one, the stage screen of the first stage may be displayed on the lower image display panel 6. When the variable N is two, the stage screen of the second stage may be displayed on the lower image display panel 6. When the variable N is three, the stage screen of the final stage may be displayed on the lower image display panel 6. And this process may be executed between the game controller 100 and the graphic board 68.

In S25, on the stage screen displayed on the lower image display panel 6, it is determined whether there is a treasure box 101 which is in a close state (not selected), by the game controller 100. The determination process is executed based on the "state" data item stored in the selection item table of this stage (see FIG. 11 to FIG. 14). Here, when it is determined that there is not a treasure box 101 which is in a close state (S25: NO), procedure shifts to S31. When it is determined that there is a treasure box 101 which is in a close state (S25: YES), procedure proceeds to S26.

In S26, on the stage screen displayed on the lower image display panel 6, it is determined whether a treasure box 101 which is in a close state (not selected) is selected by the game controller 100. Here, a player may select any treasure box 101 which is in a close state by touching the touch panel 11 on the stage screen displayed on the lower image display panel 6. Here, the determination process is executed based on the coordinate position information from the touch panel 11 in additional to the "state" data item stored in the selection item table of this stage (see FIG. 11 to FIG. 14). When it is determined that none of the treasure boxes 101 in a close state is selected (S26: NO), procedure returns to S26, and procedure waits until a treasure box 101 in a close state is selected on the stage screen displayed on the lower image display panel 6. When it is determined that a treasure box 101 in a close state is selected (S26: YES), procedure proceeds to S27.

In S27, the content display process of the selected treasure box may be executed by the game controller 100.

Concretely, on the stage screen displayed on the lower image display panel 6, the treasure box selected by the player may be displayed from a close state to an open state. And this process may be executed between the game controller 100 and the graphic board 68.

At this time, on the selection item table of the stage stored in the RAM 43, the "state" data item corresponding to the treasure box 101, which is displayed from a close state to an open state, is rewritten by "O" from "X" by the game controller 100 (see FIG. 14).

Also, on the stage screen displayed on the lower image display panel 6, the content corresponding to the treasure box 101 which is changed to an open state, is overlapped and displayed on the treasure box 101, based on the data stored in the "content" data item of the selection item table of the stage, which is stored in the RAM 43 (see FIG. 1, FIG. 8, FIG. 15 and FIG. 16). Furthermore, on the stage screen displayed on the lower image display panel 6, when the content corresponding to the treasure box 101 which is changed to an open state is payout amount, the payout amount may be added to the payout amount display portion 9. Also this process may be executed between the game controller 100 and the graphic board 68.

And the payout amount may be added to the payout information in the RAM 43 by the game controller 100. The sum of the payout amount newly displayed on the current stage screen, may be stored in the RAM 43 as the sum of the payout amount obtained by the player in the current stage, until it is renewed to another stage by the game controller 100.

In S28, the variable M which is stored in the RAM 43 may be incremented by one by the game controller 100. Then the procedure is proceeded to S29.

In S29, it is determined whether the content corresponding to a treasure box 101 is a symbol of "BELL" about the treasure box 101 which is changed from a close state to an open state by the game controller 100. The determination process is executed based on the selection item table of this stage stored in the RAM 43 (see FIG. 11 to FIG. 14). Here, when it is determined that the content overlapped and displayed on the treasure box 101, is a symbol of "BELL" (S29: YES), procedure shifts to S39. When it is determined that the content overlapped and displayed on the treasure box 101, is not a symbol of "BELL" (S29: NO), procedure proceeds to S30.

In S30, it is determined whether the content corresponding to a treasure box 101 is a symbol of "STRAWBERRY" about the treasure box 101 which is changed from a close state to an open state by the game controller 100. The determination process is executed based on the selection item table of this stage stored in the RAM 43 (see FIG. 11 to FIG. 14). Here, when it is determined that the content overlapped and displayed on the treasure box 101, is a symbol of "STRAWBERRY" (S30: YES), procedure shifts to S35. When it is determined that the content overlapped and displayed on the treasure box 101, is not a symbol of "BELL" (S30: NO), procedure proceeds to S31.

In S31, it is determined whether the variable M stored in the RAM 43 is three by the game controller 100. Here, when it is determined that the variable M which is stored in the RAM 43 is not three (S31: NO), procedure shifts to S33. When it is determined that the variable M stored in the RAM 43 is three (S31: YES), procedure proceeds to S32.

In S32, it is determined whether the variable N stored in the RAM 43 is three by the game controller 100. Here, when it is determined that the variable N which is stored in the RAM 43 is three (S32: YES), the bonus game may be terminated, and the process may be returned to the main game process as shown in FIG. 18. When it is determined that the variable N stored in the RAM 43 is not three (S32: NO), procedure proceeds to S33.

In S33, the variable N which is stored in the RAM 43 may be incremented by one by the game controller 100. Then the procedure is proceeded to S34.

In S34, the variable M stored in the RAM 43 may be substituted by "0" by the game controller 100. And then the procedure may be returned to S24. Thereby, on the lower image display panel 6, the stage screen of the next stage may be displayed.

In above S30, when it is determined that the content overlapped and displayed on the treasure box 101, which is changed from a close state to an open state, is a symbol of "STRAWBERRY" (S30: YES), procedure shifts to S35, and the second branched screen display process may be executed. Concretely, on the stage screen of the lower image display panel 6, the next stage button 103B and the game termination button 104B may be displayed by the game controller 100 (see FIG. 16). The process may be executed between the game controller 100 and the graphic board 68.

In S36, it is determined whether the next stage button 103B is selected by the player by the game controller 100. Here, on the stage screen of the lower image display panel 6, the next stage button 103B may be selected by the player through the touch panel 11. Therefore, it is determined based on the coordination position information. Here, when it is determined that the next stage button 103B is selected by the player (S36: YES), procedure proceeds to S37.

In S37, the preservation process of the selected treasure box is executed by the game controller 100. And then, procedure returns to S24 via above-mentioned S33. The stage screen of the next stage may be displayed the lower image display panel 6.

In the process of S37, on the stage screen displayed on the lower image display panel 6, the display state of the opened treasure boxes 101 on each of which the content is displayed is preserved until the above-mentioned S24 is executed secondly. Therefore, when the next stage button 103B is touched by the player on the lower image display panel 6, the screen of the stage changes from the current stage to the next stage, and the states of the treasure boxes 101 at the same positions in both the two stages are preserved.

In above S36, when it is determined that the next stage button 103B is not selected by the player (S36: NO), procedure shifts to S38. Here, on the stage screen displayed on the lower image display panel 6, when the game termination button 104B is touched through the touch panel 11 by the player, it is determined that the next stage button 103B is not selected by the player. Therefore, it is also determined based on the coordination position information from the touch panel 11.

In S38, the payout doubling process is executed by the game controller 100.

Concretely, the sum of the payout amount obtained on the stage screen of the current stage is added to the payout information in the RAM 43 by the game controller 100. And the sum of the payout amount is added to the payout amount display portion 9 based on the output of the display control signals to the graphic board 68. The bonus game process is terminated, and procedure returns to the main game process shown in FIG. 18.

In above S29, when it is determined that the content overlapped and displayed on the treasure box 101, which is changed from a close state to an open state, is a symbol of "BELL" (S29: YES), procedure shifts to S39, and the first branched screen process may be executed by the game controller 100. Concretely, on the stage screen displayed on the lower image display panel 6, the previous stage button 103A and the game termination button 104A are displayed by the game controller 100 (see FIG. 15). The process may be executed between the game controller 100 and the graphic board 68.

In S40, it is determined by the game controller 100 whether the previous stage button 103A is selected by the player. Here, on the stage screen of the lower image display panel 6, the next stage button 103B may be selected by the player through the touch panel 11. Therefore, it is determined based on the coordination position information process. Here, when it is determined that the previous stage button 103A is selected by the player (S40: YES), procedure proceeds to S41.

In S41, the preservation process of the selected treasure box is executed by the game controller 100. In the process of S41, on the stage screen displayed on the lower image display panel 6, the display state of the opened treasure boxes 101 on each of which the content is displayed is preserved until the above-mentioned S24 is executed secondly.

And then, in S42, the variable N which is stored in the RAM 43 may be incremented by one by the game controller 100. The procedure proceeds to S43.

In S43, the variable M stored in the RAM 43 may be substituted by "0" by the game controller 100. And then the procedure may be returned to S44.

In S44, the payout half-off process is executed by the game controller 100.

Concretely, half of the payout amount obtained in the current stage is deducted from the payout information in the RAM 43 by the game controller 100. And half of the payout amount is displayed on the payout amount display portion 9, based on the output of the display control signals to the graphic board 68.

And then procedure returns to S24. Here, since the process is returned to above S24 after the above S42, the stage screen of the previous stage is displayed on the lower image display panel 6. Therefore, when the previous stage button 103A is touched by the player on the lower image display panel 6, the screen of the stage changes from the current stage to the previous stage, and the state of the treasure boxes 101 at the same positions in both the two stages are preserved.

In above S40, when it is determined that the previous stage button 103A is not selected by the player (S40: NO), the bonus game process is terminated, and procedure returns to the main game process shown in FIG. 18. Here, on the stage screen displayed on the lower image display panel 6, when the game termination button 104A is touched through the touch panel 11 by the player, it is determined that the previous stage button 103A is not selected by the player. Therefore, it is also determined based on the coordination position information from the touch panel 11.

When procedure returns to the main game process shown in FIG. 18, or when it is determined that a bonus game trigger is realized (S16: NO), the payout process may be executed by the controller 100. In the payout process, the payout amount obtained in a base game and a bonus game respectively, may be paid out to the player based on the payout information stored in the RAM 43.

In the payout process, the coins corresponding to the credits (one credit equals to one coin) may be paid out by the input of the CASHOUT button 15. And also credits may be paid out by the bar-code ticket 25.

The main game process may be executed again after this process.

As explained above, in the bonus game executed in the slot machine 1 according to the embodiment, on the stage screen of the second stage displayed on the lower image display panel 6, if the content overlapped and displayed on the treasure box 101, which is changed from a close state to an open state, is a symbol of "STRAWBERRY" (S30: YES), and the next stage button 103B is touched by the player (S36: YES), the stage screen changes from the second stage to the final stage, and the states of the treasure boxes 101 at the same position in both the two stages are preserved (S37, S33, S24).

On the other hand, on the stage screen of the second stage displayed on the lower image display panel 6, if the content overlapped and displayed on the treasure box 101, which is changed from a close state to an open state, is a symbol of "BELL" (S29: YES), the previous stage button 103A and the game termination button 104A may be displayed (S39). And when the game termination button 104A is touched by the player through the touch panel 11 (S40: NO), the bonus game is terminated. And when the previous stage button 103A is touched by the player (S40: YES), the stage screen changes from the second stage to the first stage, and the states of the treasure boxes 101 at the same positions in both the two stages are preserved (S41, S42, S24).

Therefore, between the stage screen of the second stage and the first stage or the final stage, a connection is built up by the treasure box 101 in an open state. It may add virtual effect on the stage screen displayed on the lower image display panel 6.

Furthermore, on the lower image display panel 6, when the stage screen changes from the second stage to the first stage, the payout amount obtained by the player on the stage screen of the second stage may be cut to half (S44). Therefore, when the previous stage button 103A and the game termination button 104A are both displayed on the second stage screen, the player may need to carefully consider which button to be selected. This selection may have a big influence on the game result.

In other words, in the bonus game executed in the slot machine 1 according to the embodiment, the states of the treasure boxes 101 at the same positions are preserved in both the second stage and the first stage or in both the second stage and the final stage. By changing the stage screen from the second stage to the first stage, or changing the stage screen from the second stage to the final stage, virtual effect may be added to the stage screen displayed on the lower image display panel 6, and a new entertainment character may be provided.

Here, the slot machine is not limited to the above embodiment.

For example, if the content overlapped and displayed on the treasure box 101, which is changed from a close state to an open state, is a symbol of "BELL" (S29: YES), procedure may proceed to subsequent process of the S41 without executing the above S39 or S40 by the game controller 100. When the content overlapped and displayed on the treasure box 101, which is changed from a close state to an open state, is a symbol of "BELL", the previous stage button 103A and the game termination button 104A may not be displayed. Furthermore, instead of the previous stage button 103A being touched by the player, the stage screen may change directly from the second stage to the first stage, and the states of the treasure boxes 101 at the same positions in both the two stages are preserved.

If the content overlapped and displayed on the treasure box 101, which is changed from a close state to an open state, is a symbol of "STRAWBERRY" (S30: YES), procedure may proceed to subsequent process of the above S37 without executing the above S35 or S36 by the game controller 100. When the content overlapped and displayed on the treasure box 101, which is changed from a close state to an open state, is a symbol of "STRAWBERRY", the previous stage button 103B and the game termination button 104B may not be displayed. Furthermore, instead of the previous stage button 103B being touched by the player, the stage screen may change directly from the second stage to the first stage, and the states of the treasure boxes 101 at the same positions in both the two stages are preserved.

If the content overlapped and displayed on the treasure box 101, which is changed from a close state to an open state, is a symbol of "BELL" or "STRAWBERRY" (S29: YES, S30: YES), the bonus game may be generated right after the current bonus game in accordance with the result of a lottery process.

If the content overlapped and displayed on the treasure box 101, which is changed from a close state to an open state, is a symbol of "BELL" (S29: YES), the first stage may be started over again by displaying the stage screen of the final stage with all treasure boxes in a close state, on the lower image display panel 6.

The above bonus game is constructed from three stages of the first stage, the second stage and the final stage. Between the first stage and the final stage, there may exist plural stages same as the second stage.

This concept may also be applied to the game techniques from one stage to another stage.

Although the subject matter has been described in language specific to structural features and/or methodological acts, it is to be understood that the subject matter defined in the appended claims is not necessarily limited to the specific features or acts described above. Rather, the specific features and acts described above are disclose as example forms of implementing the claims.

What is claimed is:

1. A gaming machine comprising:

a display device for displaying one of plural stage screens in each of which a plurality of selections are arranged, each selection having one of a plural kinds of item information corresponded thereto and being retained in a close state, the plural stage screens including a present stage screen and a next stage screen;

an operation device operable to select any one of the selections arranged in the stage screen displayed on the display; and a processor programmed to operate with the display device and the operation device to (a) display the item information corresponding to the selection selected through the operation device in the present stage screen displayed on the display device by changing the close state to an open state, (b) calculate a payout amount obtained in the present stage screen based on the item information displayed in the present stage screen, and (c) display the next stage screen instead of the present stage screen such that the next stage screen includes at least one preserved selection from the present stage screen as arranged at a same position in the next stage screen as was arranged in the present stage screen, while continuing the close and open states of the at least one preserved selection when a first condition is realized in the present stage screen displayed on the display device.

2. The gaming machine according to claim 1, wherein when a second condition is realized in the present stage screen the processor displays a previous stage screen instead of the present stage screen while continuing the close and open states of the at least one preserved selection, the at least one preserved selection being arranged at the same position in both the present stage screen and the previous stage screen.

3. The gaming machine according to claim 1, wherein when a second condition is realized in the present stage screen the processor displays a first and second selective portions on the display device, terminates a game when the first selective portion is selected through the operation device, and displays a previous stage screen instead of the present stage screen while continuing the close and open states of the at least one preserved selection, the at least one preserved selection being arranged at the same position in both the present stage screen and the previous stage screen when the second selective portion is selected through the operation device.

4. A gaming machine comprising:

a display device for displaying one of plural stage screens in each of which a plurality of selections are arranged, each selection having one of a plural kinds of item information corresponded thereto and being retained in a close state, the plural stage screens including a present stage screen, a next stage screen, and a previous stage screen;

an operation device operable to select any one of the selections arranged in the stage screen displayed on the display; and a processor programmed to operate with the display device and the operation device to (a) display the item information corresponding to the selection selected through the operation device in the present stage screen displayed on the display device by changing the close state to an open state, (b) calculate a payout amount obtained in the present stage screen based on the item information displayed in the present stage screen, (c) display the next stage screen instead of the present stage screen such that the next stage screen and the previous stage screen include at least one preserved selection from the present stage screen as arranged at a same position in the next stage screen as was arranged in the present stage screen and as was arranged in the previous stage screen, while continuing the close and open states of the at least one preserved selection when a first condition is realized in the present stage screen displayed on the display device, (d) display a first and second selective portions on the display device when a second condition is realized in the present stage screen, (e) terminate a game when the first selective portion is selected through the operation device, (f) display the previous stage screen instead of the present stage screen while continuing the close and open states of the at least one preserved selection when the second selective portion is selected through the operation device, and (g) reduce the payout amount obtained in the present stage screen when the previous stage screen is displayed.

5. A gaming method executed in a gaming machine comprising steps of:

a selection step in which a selection is selected through an operation device in a present stage screen displayed on a display device as a game progresses, in which plural stage screens are displayed one by one on the display device, in each stage screen one of a plurality of selections being arranged and each selection having a plural kinds of item information corresponded thereto and being retained in a close state, the plural stage screens also including a next stage screen;

a display step in which the item information corresponded to the selection selected in the selection step is displayed by changing the close state to an open state;

a calculation step in which a payout amount obtained in the present stage screen is calculated based on the item information; and a display step in which the next stage screen is displayed on the display device instead of the present stage screen such that the next stage screen includes at least one preserved selection from the present stage screen as arranged at a same position in the next stage screen as was arranged in the present stage screen while continuing the close and open states of the at least one preserved selection when a first condition is realized in the present stage screen displayed on the display device.

6. The gaming method according to claim 5, further comprising a display step in which when a second condition is realized in the present stage screen a previous stage screen is displayed on the display device instead of the present stage screen while continuing the close and open states of the at least one preserved selection, the at least one preserved selection being arranged at the same position in both the present stage screen and the previous stage screen.

7. The gaming method according to claim 5, further comprising steps of:

a display step in which when a second condition is realized in the present stage screen a first and second selective portions are displayed on the display device;

a selection step in which one of the first and second selective portions is selected through the operation device;

a termination step in which a game is terminated when the first selective portion is selected through the operation device; and a display step in which a previous stage screen is displayed instead of the present stage screen while continuing the close and open states of the at least one preserved selection, the at least one preserved selection being arranged at the same position in both the present stage screen and the previous stage screen when the second selective portion is selected through the operation device.

8. A gaming method executed in a gaming machine comprising steps of:

a selection step in which a selection is selected through an operation device in a present stage screen displayed on a display device as a game progresses, in which plural stage screens are displayed one by one on the display device, in each stage screen one of a plurality of selections being arranged and each selection having a plural kinds of item information corresponded thereto and being retained in a close state, the plural stage screens also including a next stage screen and a previous stage screen;

a display step in which the item information corresponded to the selection selected in the selection step is displayed by changing the close state to an open state;

a calculation step in which a payout amount obtained in the present stage screen is calculated based on the item information;

a display step in which the next stage screen is displayed on the display device instead of the present stage screen such that the next stage screen includes at least one preserved selection from the present stage screen as arranged at a same position in the next stage screen as was arranged in the present stage screen while continuing the close and open states of the at least one preserved selection when a first condition is realized in the present stage screen displayed on the display device;

a display step in which a first and second selective portions are displayed on the display device when a second condition is realized in the present stage screen;

a selection step in which one of the first and second selective portions is selected through the operation device;

a termination step in which a game is terminated when the first selective portion is selected through the operation device;

a display step in which the previous stage screen is displayed instead of the present stage screen such that the previous stage screen includes at least one preserved selection from the present stage screen as arranged at a same position in the present stage screen as was arranged in the previous stage screen while continuing the close and open states of the at least one preserved selection when the second selective portion is selected through the operation device; and reduction step in which the payout amount obtained in the present stage screen is reduced when the previous stage screen is displayed.

* * * * *